(12) United States Patent
Tabe

(10) Patent No.: US 8,201,105 B2
(45) Date of Patent: *Jun. 12, 2012

(54) ELECTRONIC APPARATUS AND IMAGE DISPLAY CONTROL METHOD OF THE ELECTRONIC APPARATUS

(75) Inventor: Kenichi Tabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

This patent is subject to a terminal disclaimer.

(21) Appl. No.: 12/207,323

(22) Filed: Sep. 9, 2008

(65) Prior Publication Data

US 2009/0089713 A1 Apr. 2, 2009

(30) Foreign Application Priority Data

Sep. 28, 2007 (JP) ................................. 2007-255739

(51) Int. Cl.
*G06F 3/048* (2006.01)
*G06K 9/00* (2006.01)

(52) U.S. Cl. ........ 715/838; 715/721; 715/810; 382/118; 382/190; 382/224

(58) Field of Classification Search .................... 715/838
See application file for complete search history.

(56) References Cited

U.S. PATENT DOCUMENTS

| | | | |
|---|---|---|---|
| 5,864,366 A * | 1/1999 | Yeo | 375/240.12 |
| 6,584,463 B2 * | 6/2003 | Morita et al. | 386/278 |
| 6,711,587 B1 * | 3/2004 | Dufaux | 1/1 |
| 6,734,877 B1 | 5/2004 | Kondo et al. | |
| 6,851,091 B1 | 2/2005 | Honda et al. | |
| 6,862,038 B1 * | 3/2005 | Anderson | 348/207.99 |
| 6,988,244 B1 | 1/2006 | Honda et al. | |
| 2003/0184598 A1 * | 10/2003 | Graham | 345/838 |
| 2004/0019608 A1 * | 1/2004 | Obrador | 707/104.1 |
| 2005/0187943 A1 * | 8/2005 | Finke-Anlauff et al. | 707/100 |
| 2006/0110128 A1 * | 5/2006 | Dunton et al. | 386/52 |

(Continued)

FOREIGN PATENT DOCUMENTS

JP 2001-309269 11/2001

(Continued)

OTHER PUBLICATIONS

U.S. Appl. No. 12/202,998, Non-Final Office Action, mailed Feb. 16, 2011.

(Continued)

*Primary Examiner* — Boris Pesin
*Assistant Examiner* — Matthew Ell
(74) *Attorney, Agent, or Firm* — Blakely, Sokoloff, Taylor & Zafman LLP

(57) ABSTRACT

According to one embodiment, an electronic apparatus displays face images in each column of a plurality of face image display areas arranged in a matrix based on time stamp information, and displays thumbnail images in time-series in a thumbnail display area arranged at one side of a lower side or an upper side in the two dimensional display area. The apparatus displays one of the thumbnail images with a normal size and displays the others such that the lateral direction sizes are reduced in comparison with that of the thumbnail displayed in the normal size. And, the apparatus performs display control of the plurality of face images so as to make face images having times in a section corresponding to a selected thumbnail image as time stamp information distinguishable from the others, when the thumbnail image in the thumbnail display area is selected.

9 Claims, 17 Drawing Sheets

U.S. PATENT DOCUMENTS

| | | |
|---|---|---|
| 2007/0136286 A1 | 6/2007 | Webster et al. |
| 2008/0080743 A1* | 4/2008 | Schneiderman et al. ..... 382/118 |
| 2008/0152298 A1* | 6/2008 | Ubillos ........................... 386/52 |
| 2009/0089712 A1 | 4/2009 | Sato |

FOREIGN PATENT DOCUMENTS

| | | |
|---|---|---|
| JP | 2004206810 | 7/2004 |
| JP | 2007-080061 | 3/2007 |
| JP | 2007-157145 | 6/2007 |
| WO | 00/17777 A1 | 3/2000 |
| WO | 00/17778 A1 | 3/2000 |
| WO | 00/17779 A1 | 3/2000 |
| WO | 02/23350 A1 | 3/2002 |

OTHER PUBLICATIONS

U.S. Appl. No. 12/202,998, Final Office Action, mailed Aug. 1, 2011.

* cited by examiner

Attribute detection result information

CM section table

| CM section 1 | Start time, end time |
|---|---|
| CM section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer and climax level table

| Time | Cheer level | Climax level |
|---|---|---|
| T1 | 10 | 5 |
| T2 | 20 | 5 |
| T3 | 10 | 6 |
| ⋮ | ⋮ | ⋮ |

FIG. 4

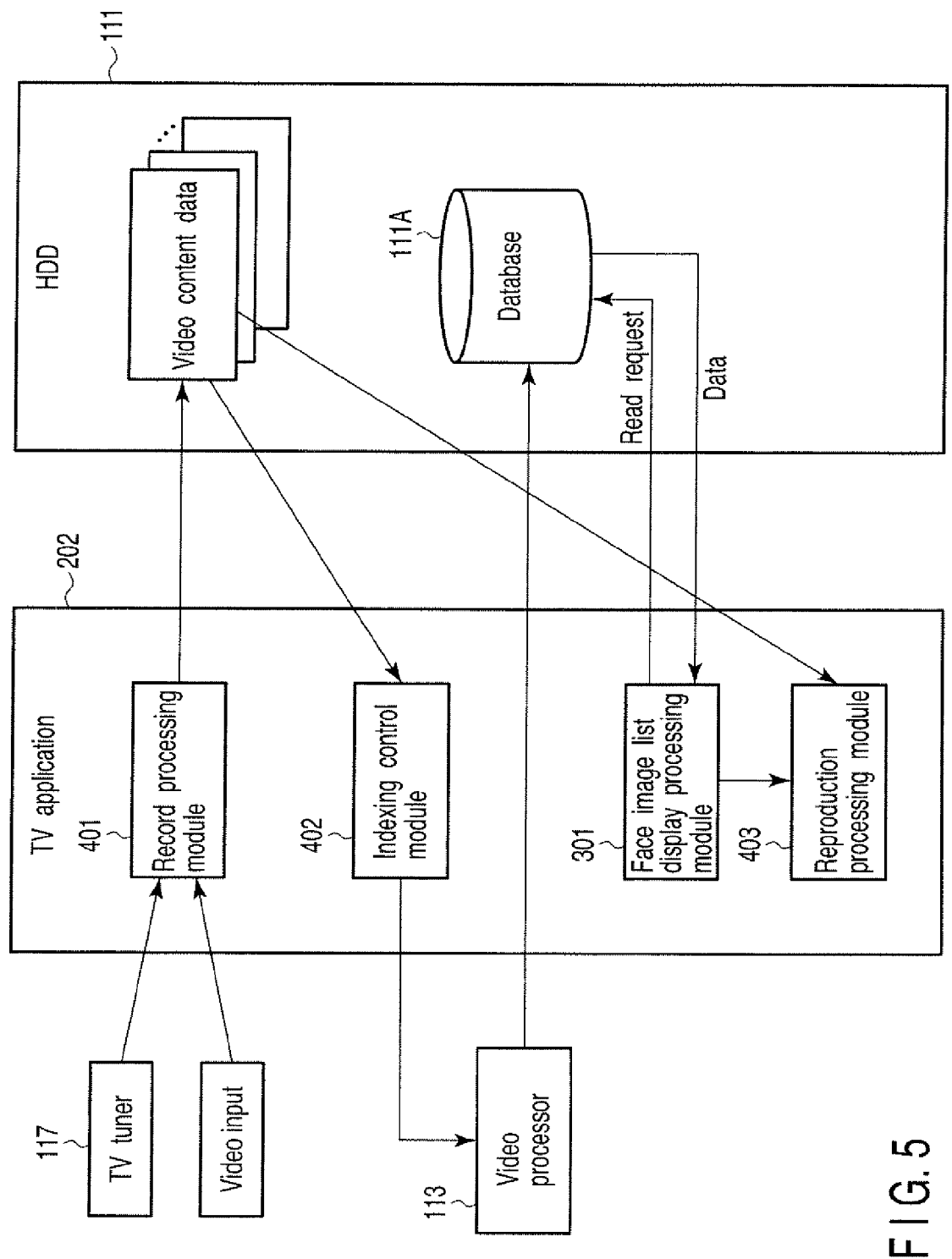
F I G. 5

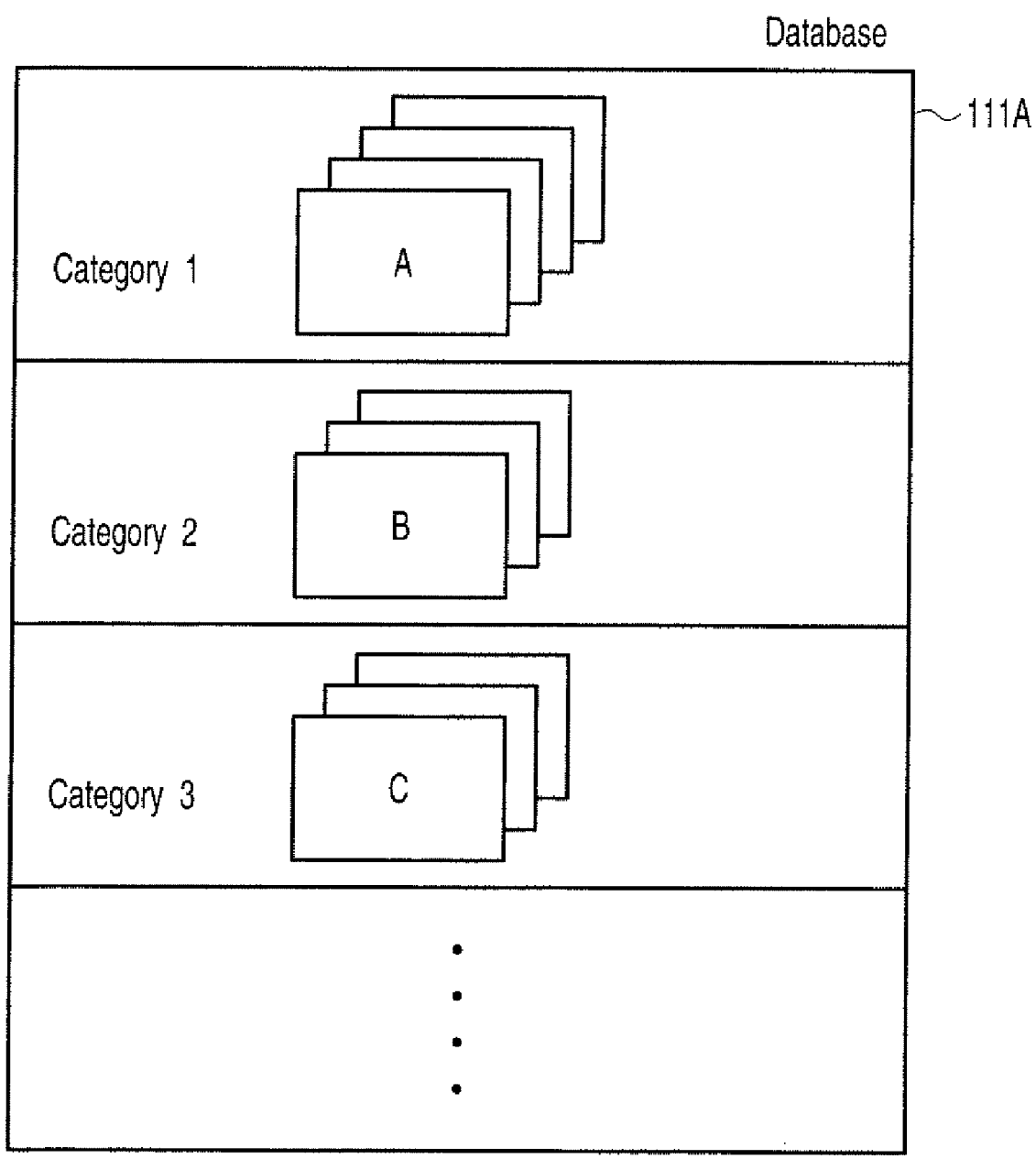
F I G. 15

ELECTRONIC APPARATUS AND IMAGE DISPLAY CONTROL METHOD OF THE ELECTRONIC APPARATUS

CROSS-REFERENCE TO RELATED APPLICATIONS

This application is based upon and claims the benefit of priority from Japanese Patent Application No. 2007-255739, filed Sep. 28, 2007, the entire contents of which are incorporated herein by reference.

BACKGROUND

1. Field

One embodiment of the present invention relates to an image display control technique for a user interface so as to enable a user to efficiently select a reproduction start position of video content data.

2. Description of the Related Art

In general, an electronic apparatus such as a video recorder or a personal computer may record and reproduce a variety of items of video content data, such as television broadcasting program data. In this case, while a title name is attached to each piece of the video content data stored in the electronic apparatus, it is hard for a user to recognize the content of each item of the video content data merely by the title name. Therefore, it becomes necessary for recognizing the content of the video content data to reproduce the video content data. However, it takes a long time to reproduce video content data with a long total time length even if a fast-forward function is utilized.

An apparatus with a function of displaying a list of characters is disclosed in Jpn. Pat. Appln. KOKAI Publication No. 2001309269. This apparatus has a function of displaying images of each face of the characters in video content side by side with one another as a list of the characters in the video content.

However, simply displaying a list of characters in the way disclosed in Jpn. Pat. Appln. KOKAT Publication No. 2001-309269 does not enable a user to recognize a time zone, in video content data, in which the characters appear. For instance, the user may desire to selectively reproduce only a time zone in which certain characters (or a group of characters), who attract the user's interest, appear. Therefore, it is necessary to achieve a new function of presenting which of the characters appear in which of the time zones in the total video content data. Further, a scheme which allows the user to simply confirm face images of the characters appearing in each time zone (scene) has been desired.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary view showing section attribute information (attribute detection result information) for use in the electronic apparatus of the embodiment;

FIG. 5 is an exemplary block diagram showing a functional configuration of a program for use in the electronic apparatus of the embodiment;

FIG. 15 is an exemplary view showing an aspect in which face images are classified by category by the electronic apparatus of the embodiment;

DETAILED DESCRIPTION

Figure 1:
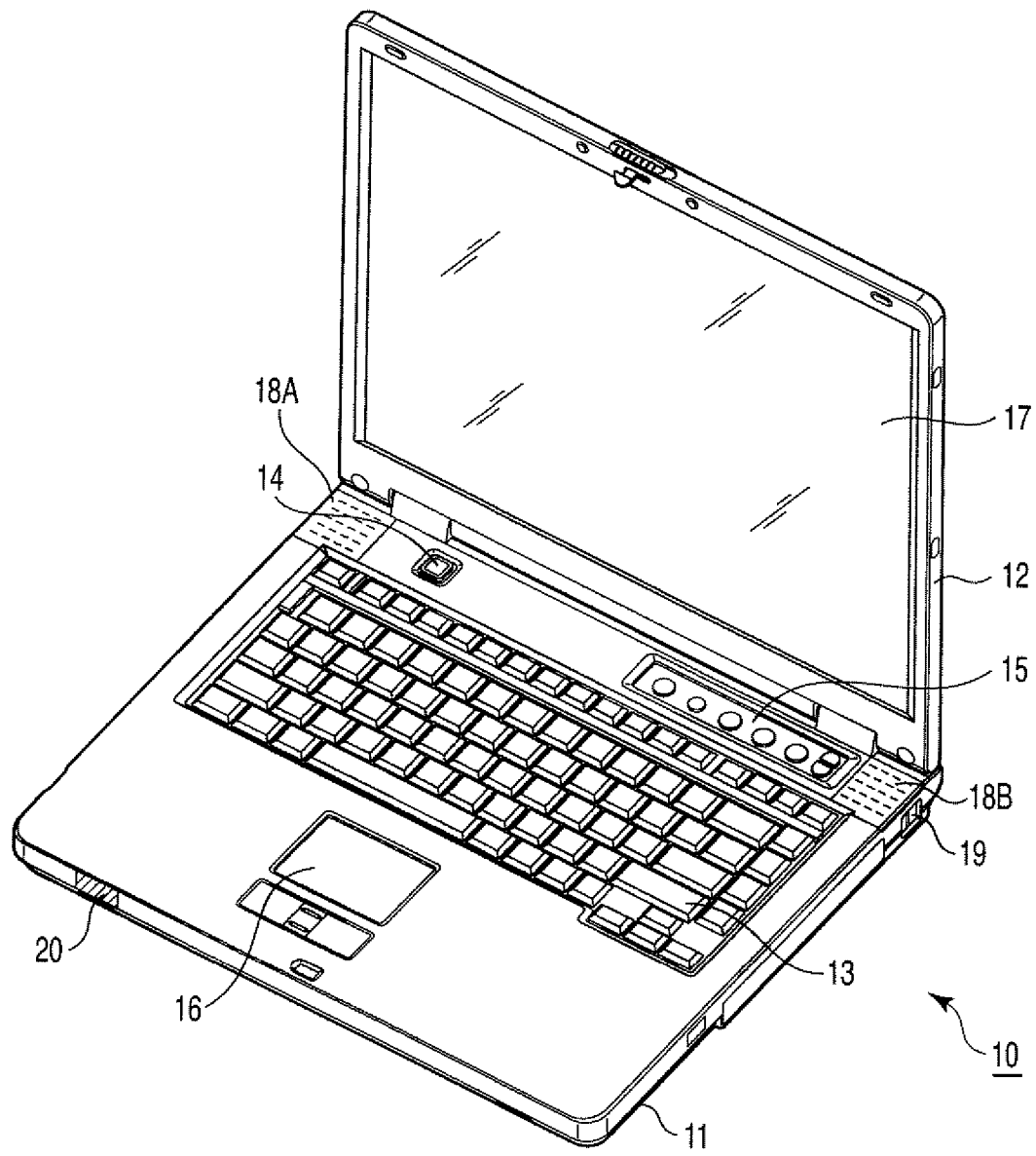
FIG. 1 is an exemplary perspective view showing an overview of an electronic apparatus of an embodiment of the invention.

Various embodiments according to the invention will be described hereinafter with reference to the accompanying drawings. In general, according to one embodiment of the invention, an electronic apparatus displays face images in each column of a plurality of face image display areas arranged in a matrix based on time stamp information, and displays thumbnail images in time-series in a thumbnail display area arranged at one side of a lower side or an upper side in the two dimensional display area. The apparatus displays one of the thumbnail images with a normal size and displays the others such that the lateral direction sizes are reduced in comparison with that of the thumbnail displayed in the normal size. And, the apparatus performs display control of the plurality of face images so as to make face images having times in a section corresponding to a selected thumbnail image as time stamp information distinguishable from the others, when the thumbnail image in the thumbnail display area is selected.

Now, referring to FIGS. 1 and 2, a configuration of an electronic apparatus of one embodiment regarding the invention will be described. The electronic apparatus of the embodiment is realized, for example, by a portable notebook personal computer 10 functioning as an information processing apparatus.

The computer 10 may record and reproduce video content data (audio visual content data) such as broadcasting program data and video data to be input from an external device. That is, the computer 10 includes a television (TV) function of carrying out viewing and recording of broadcasting program data to be broadcast by a TV broadcasting signal. This TV function is actualized, for example, by a TV application program installed in the computer in advance. The TV function also includes a function of recording video data to be input from an external audio video device, and a function of reproducing recorded video data and recorded broadcasting program data.

Further, the computer 10 includes a function of displaying a face image list for displaying a list of face images of the characters in video content data such as video data and broadcasting program data stored in the computer 10, and a function of displaying thumbnail images for displaying images (reduced images) corresponding to each of a plurality of frames extracted from the video content data, for example, at even time intervals.

The function of displaying the face image list and the function of displaying the thumbnail images are embodied as functions of the TV function, for example. The function of displaying the Lace image list is one of video indexing functions for presenting an outline, etc., of the video content data to a user. The function of displaying the face image list may present which character appears in which time zone in the total video content data to the user. The function of displaying the face image list also may display a list of characters correspond to a predetermined attribute section within the video content data.

FIG. 1 shows a perspective view in a state in which a display unit of the computer 10 is open. The computer 10 is composed of a computer main module 11 and a display module 12. The display module 12 includes a display device composed of a Thin Film Transistor Liquid-Crystal Display (TFT-LCD) 17 built-in.

The display module 12 is attached to the main module 11 rotatably between an open position, in which the upper surface of the main module 11 is exposed, and a closed position for covering the upper surface of the main module 11. The main module 11 has a thin box-shaped housing, and a keyboard 13, a power button 14 to power on/power off the computer 10, an input operation panel 15, a touch pad 16, loudspeakers 18A, 18B, etc., are arranged on the upper surface of the housing.

The panel 15 is an input device for inputting an event corresponding to a pressed button, and has a plurality of buttons for each starting a plurality of functions. The button group also includes an operation button group for controlling the TV functions (viewing, recording, reproducing recorded broadcasting program data/video data). A front face of the main module 11 is provided with a remote control unit interface module 20 for performing communication with a remote control unit to remotely control the TV functions of the computer 10. The interface module 20 is composed of an infra-red ray signal reception module, etc.

An antenna terminal 19 for TV broadcasting is disposed, for example, on the right side face of the main module 11. An external display connection terminal corresponding to, for example, the High-Definition Multimedia Interface (HDMI) standard is disposed, for example, on the rear surface of the main module 11. The connection terminal is used for outputting video data (motion image data) included in the video content data such as broadcasting program data to the external display.

Next, referring to FIG. 2, a system configuration of the computer 10 will be described.

Figure 2:
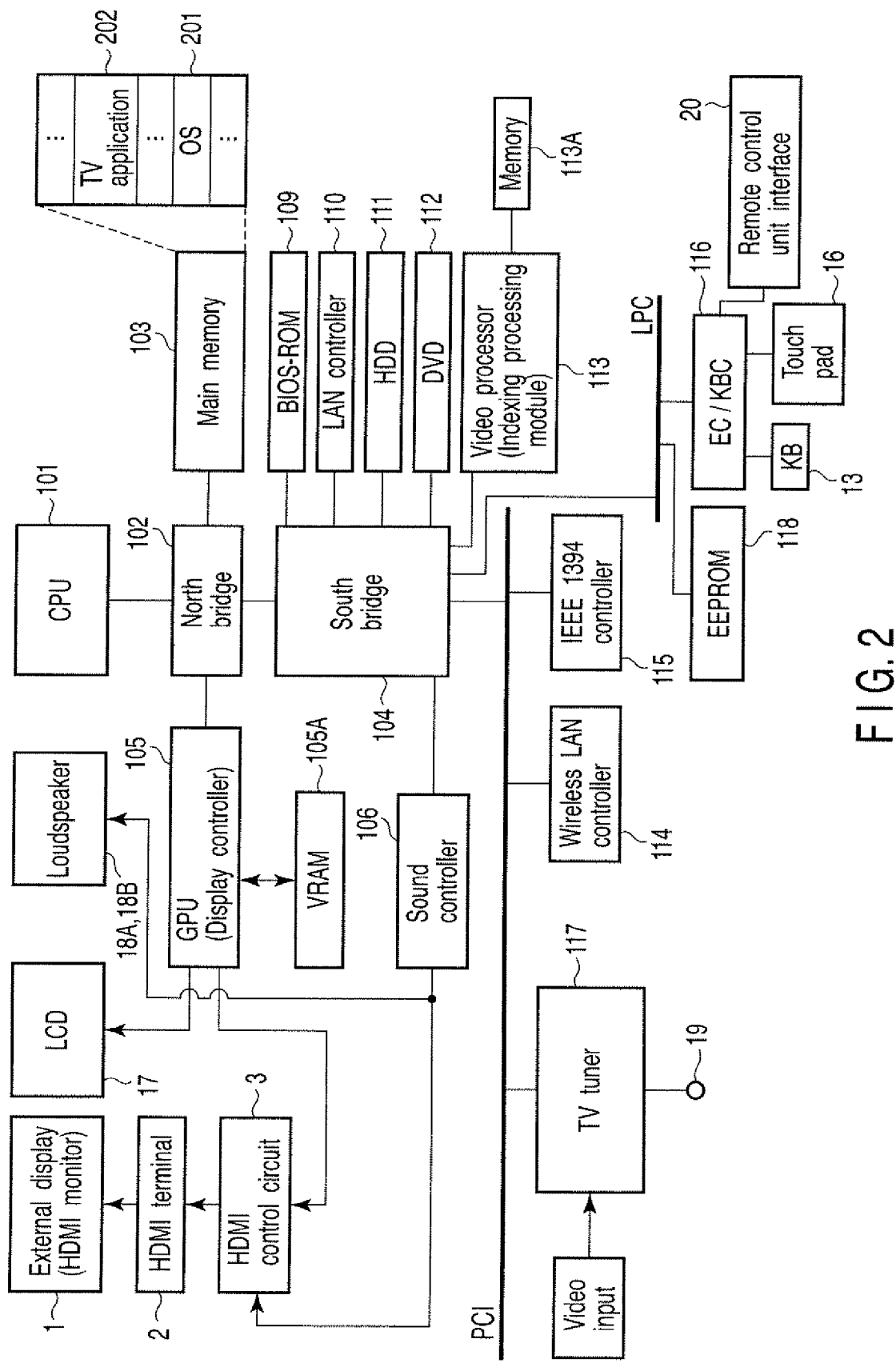
FIG. 2 is an exemplary block diagram showing a system configuration of the electronic apparatus of the embodiment.

The computer 10, as shown in FIG. 2, includes a CPU 101, a north bridge 102, a main memory 103, a south bridge 104, a graphics processing unit (CPU) 105, a video memory (VRAM) 105A, a sound controller 106, a BIOS-ROM 109, a LAN controller 110, a hard disc drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117 and an EEPROM 118, etc.

The CPU 101 is a processor for controlling operations of the computer 10, and executing various application programs such as an operating system (OS) 201 and a TV application program 202 to be loaded from the HDD 111 in the main memory 103. The TV application program 202 performs live reproduction processing for viewing the broadcasting program data received by the TV tuner 117, recording processing for recording the received broadcasting program data in the HDD 11, and reproducing processing for reproducing the broadcasting program data/video data recorded in the HOD 111 etc. The CPU 101 also executes the Basic Input Output System (BIOS) stored in the BIOS-ROM 109. The BIOS is a program for controlling hardware.

The north bridge 102 is a bridge device for connecting a local bus of the CPU 101 to the south bridge 104. The north bridge 102 also has a memory controller for controlling access the main memory 103 built-in. The north bridge 102 also has a function of performing communication with the CPU 105 through a serial bus, etc., of a PCI EXPRESS standard.

The GPU 105 is a display controller for controlling the LCD 17, which is used as a display monitor of the computer 10. A display signal generated from the GPU 105 is sent to the LCD 17. The CPU 105 also may send a digital video signal to the external display device 1 through the HDMI control circuit 3 and the HDMI terminal 2.

The HDMI terminal 2 is the aforementioned external display connection terminal. The HDMI terminal 2 may transmit an uncompressed digital video signal and a digital audio signal to the external display device 1, such as a television receiver, through a single cable. The HDMI control circuit 3 is an interface for transmitting the digital video signal to the external display device 1, called an HDMI monitor, through the HDMI terminal 2.

The south bridge 104 controls each device on a low pin count (LPC) bus and each device of a peripheral component interconnect (PCI) bus. The south bridge 104 has a built in integrated drive electronics (IDE) controller for controlling the HDD 11 and the DVD drive 12. Further, the south bridge 104 has a function to make communication with the sound controller 106.

Moreover, the video processor 113 is connected to the south bridge 104 via a serial bus, etc., of the PCI EXPRESS standard.

The video processor 113 is a processor for performing a variety of processes in relation to the aforementioned video indexing. The video processor 113 functions as an indexing processing module for performing the video indexing processing. That is, in the video indexing processing, the video processor 113 extracts a plurality of face images from the moving image data included in the video content data, and also outputs time stamp information, etc., showing the time point at which each extracted face image appears in the video content data. The extraction of the face image is performed, for example, by face detection processing for detecting the face area from each frame of the moving image data and by cut-out processing for cutting out the detected face area from the frame. The detection of the face area may be performed, for example, by analyzing a feature of the image of each frame, and by searching the area having a feature similar to a prepared face image feature sample. The face image feature sample is feature data obtained by statistically processing the face image features of many persons.

Further, the video processor 113 also performs processing for detecting a commercial (CM) section included in the video content data, and audio indexing processing. Usually, the time length of each CM section is set to one length of a number of predetermined time lengths. Silent periods with fixed time lengths are present before and after of each CM section. Thereby, in the detection processing of the CM section, for example, audio data included in the video content data is analyzed and silent sections with the fixed time lengths are detected. Sections being sandwiched between two detected and continued silent sections and also including partial data having time lengths larger than fixed values are detected as CM sections.

The audio indexing processing is an indexing processing for analyzing audio data included in the video content data and for detecting music sections in which music is played and talk sections in which persons talk with one another. The audio indexing processing, for example, analyzes a feature of a frequency spectrum of the audio data and the music sections and the talk sections are detected in response to certain features of the frequency spectrum. Since the features of the frequency spectrum corresponding to the music section and a frequency spectrum corresponding to the talk section are different from each other, analyzing the features of the frequency spectrum enables detecting the music section and the talk section, respectively. A section having a section in which the features of the frequency spectrum corresponding to the music section and the features of the frequency spectrum corresponding to the talk section are mixed may be detected as an overlap section in which the music section and the talk section are overlapped on each other.

In detection processing of the talk section, for example, a speaker segmentation technique or a speaker clustering technique is used; thereby a changeover of the speakers is detected. A period in which the same speaker (or the same speaker's group) has been talking continuously becomes one talk section.

Further, the audio indexing processing performs cheer level detection processing for detecting a cheer level for each partial data (data in a fixed time length) in the video content data, and climax level detection processing for detecting a climax level for each partial data in the video content data.

The cheer level indicates the amplitude of a cheer. A cheer is a sound of many people speaking at the same time. The sound which is composed of a large number of people all talking at the same time has a specific frequency spectrum distribution. In the cheer level detection processing, the frequency spectrum of the audio data included in the video content data is analyzed, the cheer level of each partial data is detected in accordance with an analysis result of the frequency spectrum. The climax level is a sound volume level in a section in which sound volume levels not less than a certain fixed level is continuously generated for a fixed time length. For instance, a relatively large applause, or a sound volume level of a sound such as laughing with a large sound volume is the climax level. The climax level detection processing analyzes a distribution of sound volume of the audio data included in the video content data, and detects the climax level of each partial data in accordance with the analysis result.

The memory 113A is used as a work memory for the video processor 113. A large amount of computing is needed to perform the indexing processing (CM detection processing, video indexing processing, and audio indexing processing). In this embodiment, the video processor 113, which is an exclusive processor differing from the CPU 10, is used as a back-end processor, and the video processor 113 performs the indexing processing. Therefore, the computer 10 may perform the indexing processing without increasing the load of the CPU 101. As mentioned above, since the CM detection processing may be performed by analyzing the audio data, the following will treat the CM detection processing as one item of processing in the audio indexing processing.

The sound controller 106 is a sound source device that outputs audio data to be reproduced by loudspeakers 18A, 18B or the HDMI control unit 3.

The wireless LAN controller 114 is a wireless communication device that performs wireless communication, for example, of IEEE 802.11 standard. The IEEE 1394 controller 115 performs communication with the external device through a serial bus of IEEE 1394 standard.

The EC/KBC 116 is a one-chip microcomputer with an embedded controller for power management and a keyboard controller for controlling both the keyboard (KB) 13 and the touch pad 16 integrated therein. The EC/KBC controller 116 has a function to power on/power off the computer 10 in response to the operation of the power button 14 by the user. Further, the EC/KBC 116 has a function to perform communication with the remote control unit interface 20.

The TV tuner 117 is a receiving device that receives the broadcasting program data broadcast by a TV broadcasting signal, and is connected to an antenna terminal 19. The TV tuner 117 is actualized as a digital TV tuner capable of receiving digital broadcasting program data such as terrestrial digital TV broadcasting. The TV tuner 117 also has a function to capture video data input from the external device.

Next, referring to FIG. 3, a face image list display function to be performed through the TV application program 202 will be described.

As mentioned above, the indexing processing (video indexing processing and audio indexing processing) for the video content data such as broadcasting program data is performed by the video processor 113 as the indexing processing function.

The video processor 113 executes the indexing processing on the video content data, such as recorded broadcasting program data specified by the user, under the control of the TV application program 202. The video processor 113 may perform the indexing processing on the broadcasting program data while performing recording processing for storing the broadcasting data received by the TV tuner 117 in the HDD 111.

In the video indexing processing (also referred to as face image indexing processing), the video processor 113 analyzes the moving image data included in the video content data by frame. The video processor 113 extracts the face image of the person from each of a plurality of frames consisting of the moving image data, and outputs time stamp information showing the time point at which each extracted face image appears. As regards the time stamp information corresponding to each face image, the passage of time from the start of the video content data up to the appearance of the relevant face image, or frame number from which the relevant face image has been extracted, etc., can be used. At the time, the video processor 113 also outputs the size (resolution) of each extracted face image.

Further, the video processor 113 classifies extracted face images in such a manner that images which are considered to show the same person are collected in each class, and then outputs classification results (such as class IDs) as classification information. The face detection result data (face image, time stamp information TS and size) to be output from the video processor 113 is stored in the database 111A as face image indexing information. The database 111A is a storage area for indexing data storage prepared in the HDD 111.

In the video indexing processing, the video processor 113 also performs thumbnail image obtaining processing of the thumbnail image display function in parallel with the face image extraction processing of the face image list display function. The thumbnail Image is an image (reduced image) corresponding to each of a plurality of frames extracted at even time intervals from the video content data. That is, the video processor 113, for example, extracts frames in turn at even time intervals from the video content data regardless of frames that do or do not include face images, and outputs an image (thumbnail image) corresponding to each extracted frame and the time stamp information TS showing the time point at which the thumbnail images appear. The resultant thumbnail image data obtained (thumbnail, timestamp information TS) to be output from the video processor 113 is also stored in the database 111A as thumbnail indexing information.

In the audio indexing processing, the video processor 113 analyzes the audio data included in the video content to detect a plurality of kinds of attribute sections (CM section, music section, and talk section) included in the video content data, and outputs section attribute information showing the detected start time point and the end time point included in the video content data. This section attribute information is stored in the database 111A as the attribute detection result information. Further, in the audio index processing, the video processor 113 also performs the cheer level detection processing and the climax level detection processing. The results of the cheer level detection processing and climax level detection processing are also stored in the database 111A as a part of the aforementioned attribute detection result information.

The attribute detection result information (section attribute information) is, as shown in FIG. 4, for example, composed of a CM section table, a music section table, a talk section table, and a cheer/climax level table.

The CM section table stores CM section attribute information showing the start time point and end time point of the detected CM section. If there are a plurality of CM sections in a sequence from a start time point to an end time point of the video content data, the CM section attribute information corresponding to the plurality of CM sections, respectively, is stored in the CM section table. The CM section table stores start time information and end time information showing the start time point and the end time point of the corresponding-CM section for each detected CM section.

The music section table stores music section attribute information showing the detected start time point and the end time point. If there are a plurality of music sections in the sequence from the start time point to the end time point of the video content data, the music section attribute information corresponding to the plurality of music sections, respectively, is stored in the music section table. The music section table stores start time information and end time information showing the start time point and the end time point of the corresponding-music section, respectively, for each detected music section.

The talk section table stores the music section attribute information showing the start time point and the end time point of the detected talk section. If there are a plurality of talk sections in a sequence from a tart position to an end position of the video content data, talk section attribute information corresponding to each of the plurality of talk sections is stored in the talk section table, respectively. The talk section table stores start time information and end time information each showing the start time point and the end time point of the corresponding talk section for each talk section.

The cheer/climax level table stores the cheer levels and climax levels at each data (time segment T1, T2, T3, . . . ) of the fixed time length in the video content data.

Figure 3:
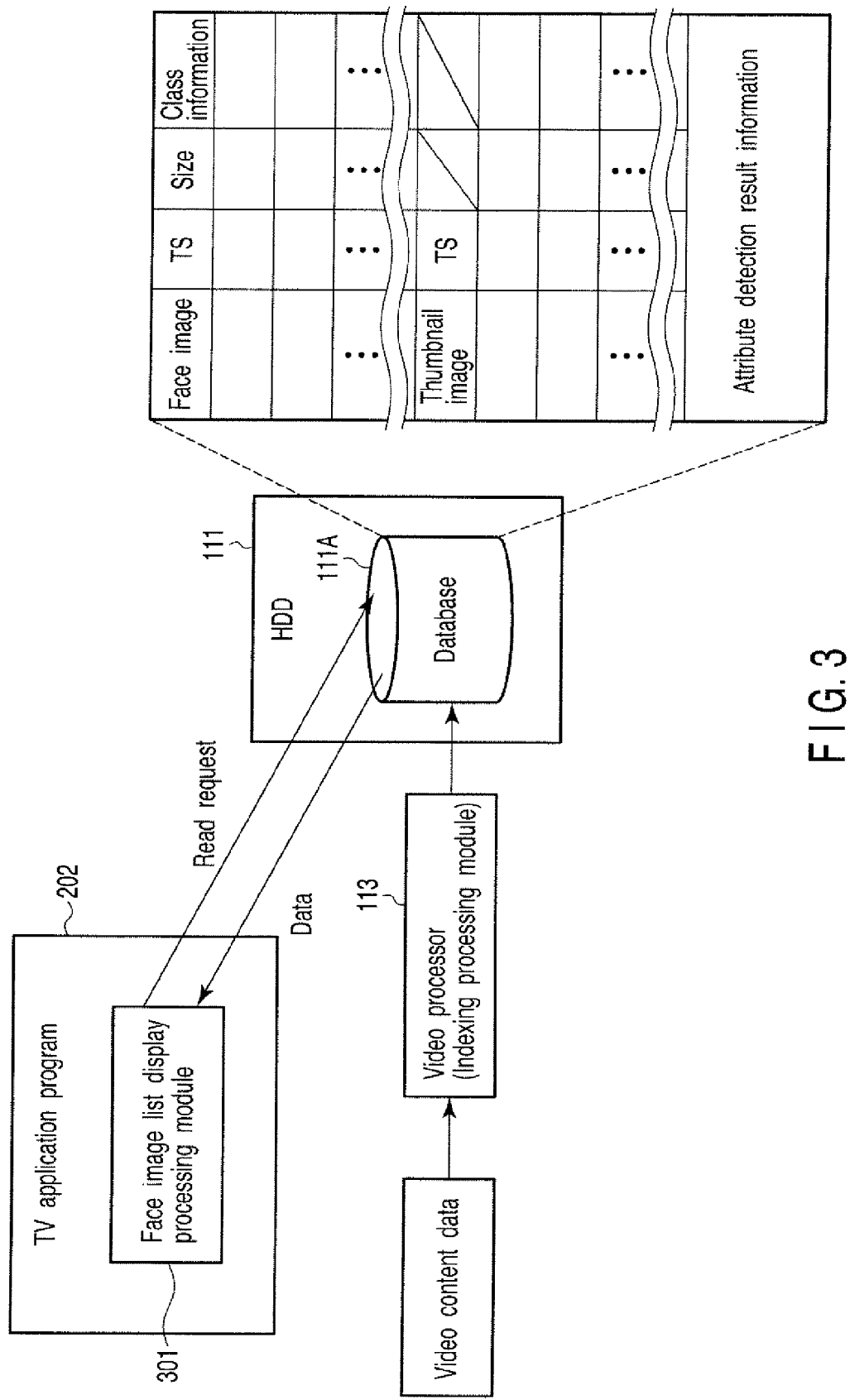
FIG. 3 is an exemplary block diagram for explaining a function of displaying a face image list of the electronic apparatus of the embodiment.

The TV application program 202, as shown as FIG. 3, includes a face image list display processing module 301 so as to perform a face image list display function. The processing module 301 is achieved, for example, as an indexing viewer program, and displays an indexing view screen so as to look down upon an outline of the video content data by using indexing information (face image indexing information, thumbnail indexing information, section attribute information, etc.) stored in the database 111A.

More specifically, the processing module 301 reads the face image indexing information (face image, time stamp information TS and size) from the data base 111A, and displays, by using the indexing information, a list of face images of the characters appearing in the video content data on a two-dimensional display area (hereinafter referred to as face thumbnail display area) on the indexing view screen. In this case, the processing module 301 divides the total time length of the video content data, for example, at even intervals into a plurality of time zones, and detects the predetermined number of face images appearing in the corresponding-time zone among the extracted face images. The processing module 301 displays each of the predetermined number of the selected face images side by side for each time zone.

That is, the two-dimensional thumbnail display area includes a plurality of face image display areas arranged in a matrix including a plurality of rows and columns consisting of the total time length of the video content data. A plurality of time zones consisting of the total time length of the video content data are assigned to each of the columns. More particularly, a plurality of time zones having the same time length which are obtained by dividing the total time length of the video content data at even intervals by the number of the plurality of columns are assigned to each of the columns. Of course, it is not necessary for the time zones assigned to each column to have the same time length.

The face image list display processing module 301 displays each face image belonging to the time zone to be assigned to the relevant column on a face image display area by the number of rows belonging to each column, for example, in an order of appearance frequency of face images (order of detected time length of face images), on the basis of the time stamp information TS and the classification information corresponding to each face image. In this case, for example, the face images are selected by the number of rows in descending order of appearance (appearance frequency)

and the selected face images are arranged from top to bottom in descending order of appearance. Of course, the face images appearing in the time zone to be assigned to each column may be displayed in order of appearance, instead.

Figure 6:
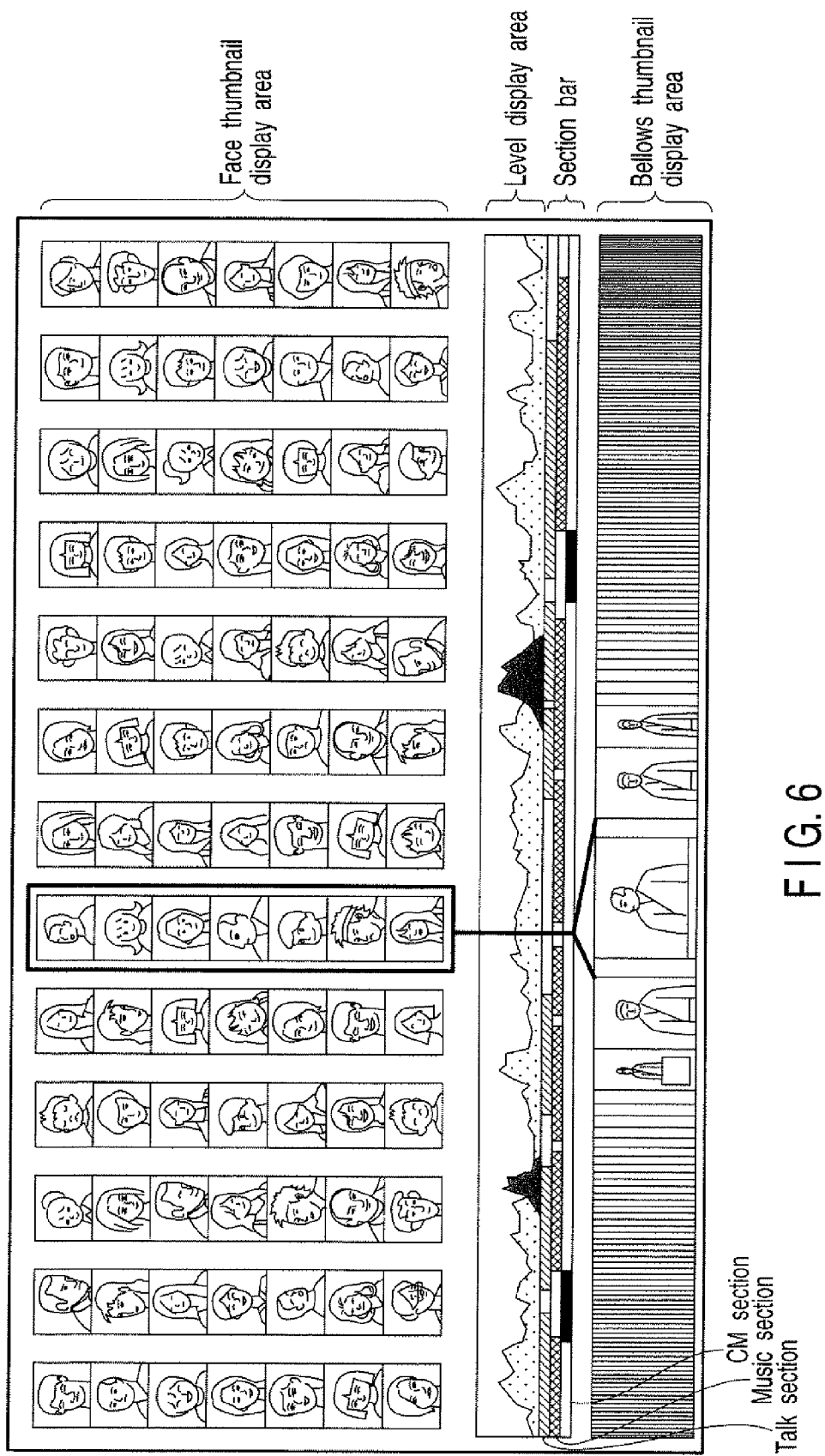
FIG. 6 is an exemplary view showing an indexing view screen to be displayed on a display device by the electronic apparatus of the embodiment.

The face image list display function allows the user to easily recognize which of the characters appears in which of the time zones in the total video content data. FIG. 6 or later each show concrete configuration example of the face thumbnail display area.

The face image list display processing module 301 also performs the thumbnail image display function. The processing module 301 reads the thumbnail indexing information (thumbnail, time stamp information TS) from the database 111A, and displays each thumbnail image on one line in descending order of appearance times of the thumbnail images on the thumbnail display area (hereinafter referred to as bellows thumbnail display area) arranged on one of the lower and upper sides of the face thumbnail display area.

Depending on the video content data, there are time zones in which no face image appears. Therefore, displaying not only the face thumbnail display area but also the bellows thumbnail display area on the indexing view screen allows the user to recognize the content of the video content data even in the time zone in which no face image appears.

Further, the processing unit 301 reads the section attribute information (CM section attribute information, music section attribute information, talk section attribute information) from the database 111A, and displays section bars including bar areas showing positions (sections from the start time points to the end time points) on one of the lower and the upper sides of the face thumbnail display area on the indexing view screen. The section bar includes, for example, three sub-section bars, namely the CM section bar indicating the position of the CM section, the music section bar indicating the position of the music section, and the talk section bar indicating the position of the talk section.

In a case where a plurality of CM sections are present in the sequence, a plurality of bar areas indicating each position of the plurality of CM sections are displayed in the CM section bar. Similarly, in a case where a plurality of music sections are present in the sequence, a plurality of bar areas indicating each position of the plurality of music sections are displayed in the music section bar, and in a case where a plurality of talk sections are present in the sequence, a plurality of bar areas indicating each position of the plurality of talk sections are displayed in the talk section bar. Hereinafter, each of the plurality of CM sections present in the sequence in a scattering manner is referred to as a partial CM section, each of the plurality of music sections present in the sequence in a scattering manner is referred to as a partial music section, and each of the plurality of talk sections present in the sequence in a scattering manner is referred to as a partial talk section.

Displaying the section bar on the indexing view screen enables presenting, to the user, which of the attribute sections (CM section, music section, and talk section) makes each face image in the face thumbnail display area appear. Therefore, the user may find, from the video content data, the data position to start reproduction of the total video content data by taking the characters and the section attributes into account.

Moreover, the processing module 301 reads cheer level information and climax level information from the database 111A, and displays a graph showing changes in cheer level information and climax level information in sequence from the start position to the end position of the video content data in accordance with the cheer level information and the climax level information on the level display area arranged on one of the lower and the upper sides of the face thumbnail area on the indexing view screen.

By presenting the level display area to the user, the processing module 301 may present where the section in which a high cheer level occurs in the video content data, and where the section in which high climax level occurs in the video content data. The user can then find, from the total video content data, the data position to start the reproduction by taking the characters, the section attribute and the cheer level and the climax level into account.

Referring now to FIG. 5, a functional configuration of the TV application program 202 will be described.

The TV application program 202 includes a record processing module 401, an indexing control module 402, a reproduction processing module 403, etc., in addition to the foregoing face image list display processing module 301. The processing module 401 performs recording processing which records the broadcasting program data received by the TV tuner 117 or records the video data HDD 111 to be input from the external device. The record processing module 401 also performs reservation recording processing which receives broadcasting program data to be specified by recording reservation information (channel number, date and hour) preset by the user, and records the broadcasting program data in the HDD 111.

The indexing control module 402 controls the video processor (indexing processing unit) 113 to cause the video processor 113 to perform the indexing processing (video indexing processing, audio indexing processing). The user may specify whether the indexing processing is to be performed for each broadcasting program data to be recorded. For instance, as regards the broadcasting data to be recorded to which the execution of the indexing processing is instructed, the indexing processing is automatically started after the broadcasting program data is recorded in the HDD 111. The user also may specify the video content data to which the indexing processing should be applied among the video content data to be stored in the HDD 111.

The reproducing processing module 403 reproduces each piece of video content data stored in the HDD 111. The reproduction processing module 403 has a function of starting the reproduction of the video content data from a time point before a predetermined time at which the selected face image appears, if a reproduction instruction event is input through a user's operation in a state in which one face image has been selected among a face image list of a certain item of video content data.

By selectively specifying a plurality of attribute sections, the user may decide the reproduction position of the video content data while watching the face image list specified by attributes.

It is not always necessary for the indexing processing to be performed by the video processor 113, for example, the TV application program 202 may have a function of performing the indexing processing. In this case, the indexing processing is executed by the CPU 101 under the control by the TV application program 202.

The following will describe a concrete configuration of an indexing view screen with reference to FIGS. 6-11.

FIG. 6 shows an example of an indexing view screen to be displayed on an LCD 17 by the face image list display processing module 301. This indexing view screen is a frame which has been obtained by applying the indexing processing to a certain item of the video content data (e.g., broadcasting program data). The indexing view screen includes the foregoing face thumbnail display area for displaying the list of the face images, and the foregoing bellows thumbnail display area for display the foregoing level display area, the foregoing section bar, and the foregoing bellows thumbnail display area for displaying the list of thumbnail images in a bellows form.

Here, the bellows form is a form in which the selected thumbnail image is displayed in a usual size (full size) and other thumbnail images are displayed with their lateral direction sizes reduced. In FIG. 6, the further the selected thumbnail is apart from the selected thumbnail image, the further the lateral size of the thumbnail is reduced.

The level display area displays a graph showing a change in climax level (graph shown with a deep color in FIG. 6) and a graph showing a change in cheer level (graph shown with a light color in FIG. 6).

The section bar includes the talk section bar, the music section bar and the CM section bar. The CM section bar displays the bar areas (band-like areas with a black color in FIG. 6) at the position of each CM section (each partial CM section). The music section bar displays the bar areas (band-like areas with cross-hatching in FIG. 6) at the position of each music section (each partial music section). The talk section bar displays the bar areas (band-like areas with hatching in FIG. 6) at the positions of each talk section (each partial talk section). The user may select any one of the talk section bar, the music section bar and the CM section bar by operation of a button and a cursor key of the remote control unit. The user also may select one bar section among the selected section bars by operating the button and the cursor key of a remote control unit.

Figure 7:
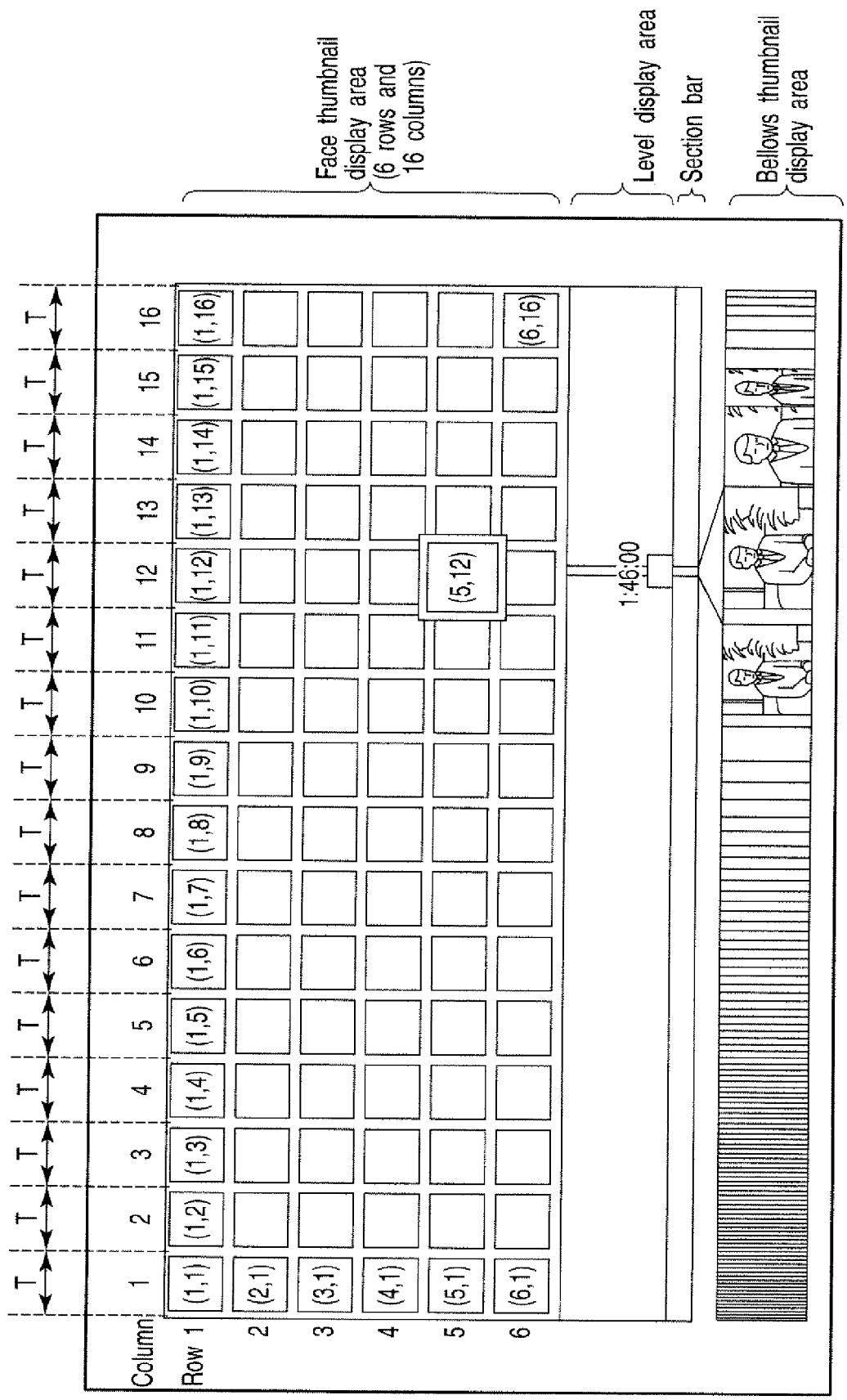
FIG. 7 is an exemplary view showing a configuration of a face thumbnail display area included in the indexing view screen of FIG. 6.
Figure 8:
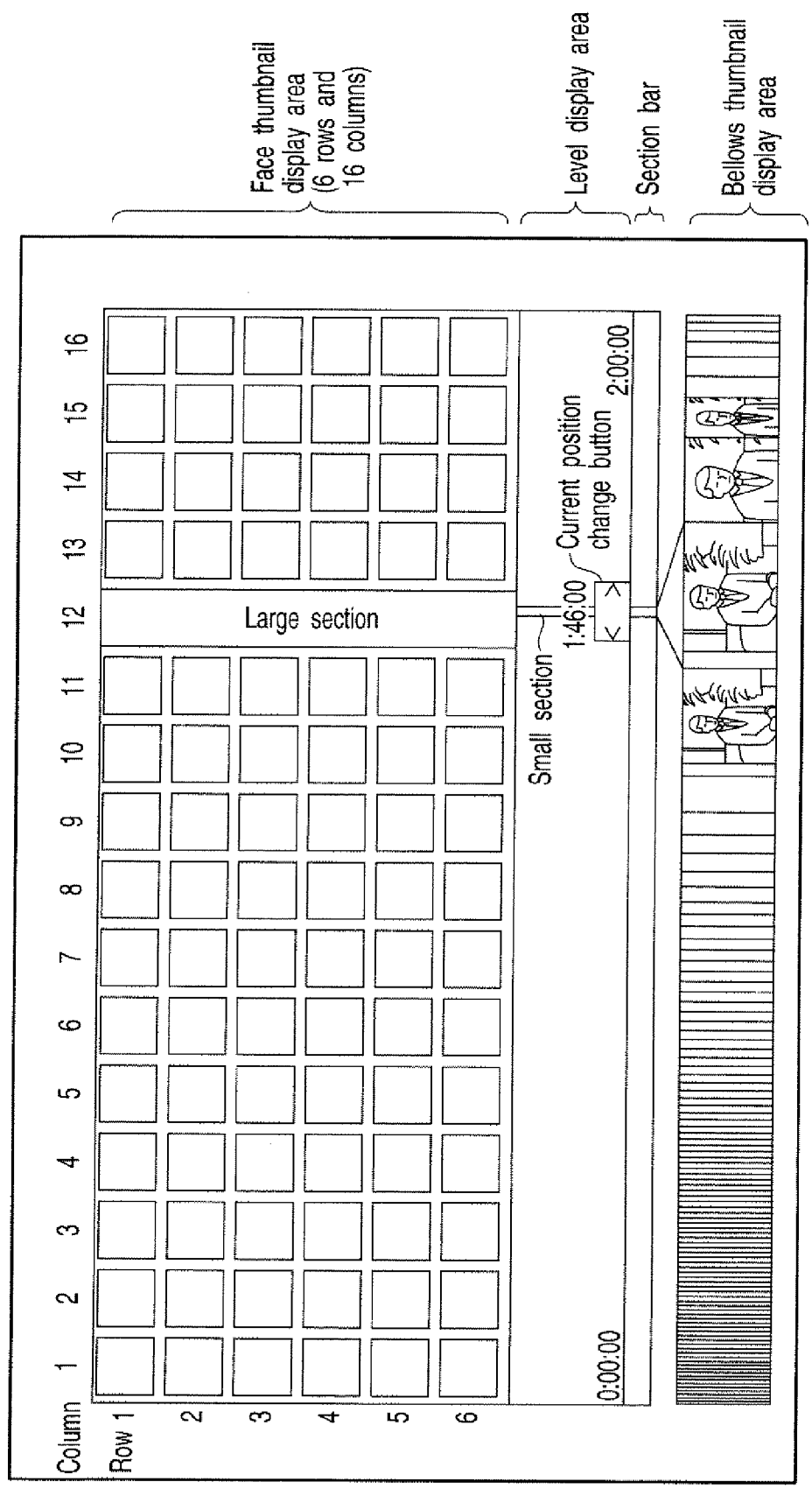
FIG. 8 is an exemplary view for explaining relationships among face thumbnail display areas and bellows thumbnail display areas.

FIG. 7 shows a configuration example of the face thumbnail display area.

The face thumbnail display area includes a plurality of face image display areas arranged in a matrix, which includes a plurality of rows and a plurality of columns. In FIG. 7, the face thumbnail display area is composed of 6 rows and 16 columns. The number of face image display areas included in the face thumbnail display area is 96.

A plurality of time zones mutually having the same time length T which are obtained, for example, by dividing the total time length of the video content data by the number of columns (=16) at even intervals, are assigned to the column 1-column 16, respectively.

For instance, if the total time length of the video content data is two hours, the two hours are divided into 16 time zones at even intervals. In this case, the time length T of each time zone is 7.5 minutes. For instance, a time zone from the top 0:00:00 to 0:07:30 is assigned to the column 1, and a time zone from 0:07:30 to 0:15:00 is assigned to the column 2, and a time zone from 0:15:00 to 0:22:30 is assigned to the row 3. The total time length of the video content data varies according to the time length T of each time zone.

Of course, it is not always necessary for the length of the time zone to be assigned to each plurality of columns to be the same.

The processing module 301 displays each face image belonging to the time zone assigned to the relevant column on 6 face image display areas in each column, for example, in the foregoing frequency order on the basis of the time stamp information corresponding to each face image extracted by the video processor 113. In this case, the processing module 301 selects the face images by the number of rows "6" among the face images belonging to the time zone assigned to the columns that are objects of display processing, and displays each selected face image side by side.

In this way, in the face thumbnail display area, a time axis in which the left edge position (1, 1) is a base point of the video content data and the right edge position (6, 16) is an end point of the video content data is used.

The user may select the size of the face image to be displayed in each face image display area of the face thumbnail display area from among "large", "middle" and "small". The number of the rows and columns are varied in accordance with the size of the face image selected by the user. The relationships among the sizes of the face images and the numbers of the rows and columns are expressed as follows:

(1) In a case of "large"; 3 rows and 8 columns
(2) in a case of "middle"; 6 rows and 16 columns
(3) In a case of "small"; 10 rows and 24 columns.

In the case of "large", each face image is displayed, for example, at a 180×180 pixel size. In the case of "middle", each face image is displayed, for example, at a 90×90 pixel size. In the case of "small", each face image is displayed, for example, at a 60×60 pixel size. A default face image size has been set, for example, to "middle".

Each face image in the face thumbnail display area is set to either a "standard" state which is not selected, or a "focus" state which is selected. The size of the face image in the "focus" state is set so as to be larger than any one of the sizes (180×180, 90×90, 60×60) in the "standards" state. FIG. 7 shows the case where the face image of a coordinate (5, 12) is in the "focus" state.

The number of the thumbnail images to be displayed in the bellows thumbnail display area is set to any one of, for example, 240, 144, 96 and 48 in accordance with the user's setting. The default number of the images is, for example, 240.

The thumbnail image is set in either of two states; the "standard" state which is not selected, and the "focus" state which is selected. The thumbnail image in the "focus" state is displayed in a size larger than other thumbnail images.

Next, relationships between the face thumbnail area and the bellows thumbnail display area will be described with reference to FIG. 5.

A set of face image display area groups belonging to the same column, namely each column in the face thumbnail area, is referred to as a "large section". Each column in which the "large section" is further divided into sections is referred to as a "small section". The number of the small sections included in one large section is obtained by dividing the number of the thumbnail images to be displayed in the bellows thumbnail display by the number of columns in the face thumbnail display area. For instance, if the face thumbnail display area includes 6 rows and 16 columns, and the number of thumbnail images to be displayed in the bellows thumbnail display area is 240, the number of small sections included in one large section becomes equal to 15 (=240/16). The one large section includes 15 small sections. In other words, 15 thumbnail images belong to a time zone corresponding to one large section.

The processing module 301 displays a vertically long bar connecting the large section and the thumbnail image. The vertically long bar is used to present which of the small sections among 15 small sections included in the large section corresponds to a small section corresponding to a certain thumbnail image. The vertically long bar is displayed at a position of the small section corresponding to the thumbnail image. For instance, if a certain thumbnail image is a top image among 15 thumbnail images belonging to a time zone corresponding to a certain large section, namely if a certain thumbnail image is an image corresponding to the top small section in the large section, the relevant thumbnail image is connected to the left edge of the large section through the vertically long bar. For instance, if a certain thumbnail image is an end edge image among 15 thumbnail images belonging to the time zone corresponding to a certain section, namely if the thumbnail image is an image corresponding to a small section at the end edge in the large section, the relevant thumbnail image is connected to the right edge of the large section through the vertically long bar.

Further, the processing module 301 also displays time information, showing a time point at which the thumbnail image appears, on the indexing view screen on the basis of the time stamp information of the thumbnail image.

A "current position change" button is an operation button for changing the thumbnail image to be selected. When the user operates a left cursor key or a right cursor key in a state where the "current position change" button is focused on, the thumbnail image to be selected is moved to the right or left, for example, by one small section.

In the indexing view screen including the face thumbnail display area and the bellows thumbnail display having such relationship, if a certain lace image existing in the face thumbnail area is selected by the user, the processing module 301 specifies a small section including a time shown by the time stamp information of the face image, and controls a display of the thumbnail image in the bellows display area so as to display the thumbnail image corresponding to the specified small section.

Figure 9:
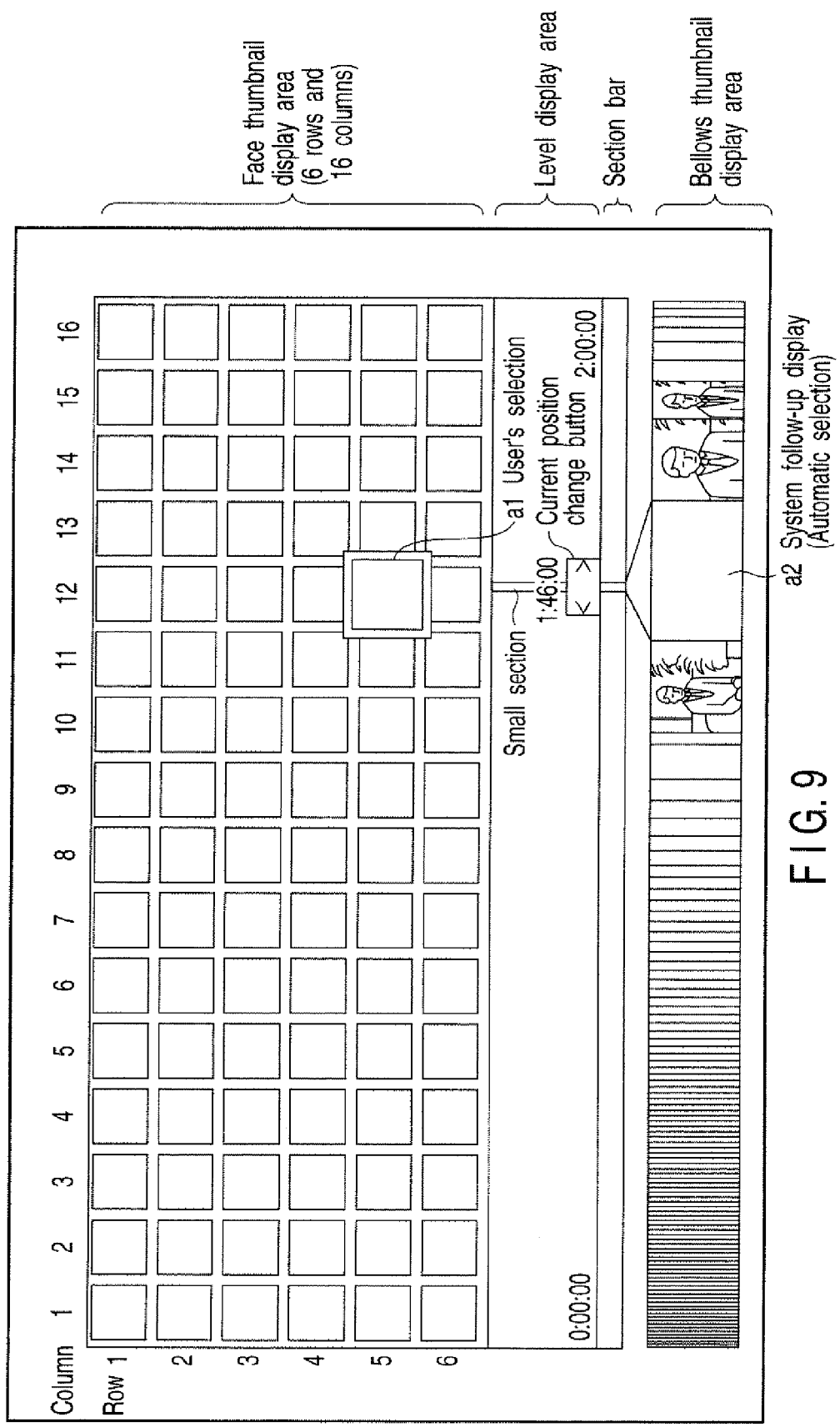
FIG. 9 is an exemplary first view for explaining link display control between a face thumbnail display area and a bellows thumbnail display area included in the indexing view screen of FIG. 6.

More specifically, as shown in FIG. 9, when a certain face image (a1) is selected by the user, a thumbnail image (a2) in the time zone in which the person of the face image appears is automatically selected, and, as a result, a follow-up display in conjunction with the selection is performed.

Conversely, in the indexing view screen, if a certain thumbnail image on the bellows thumbnail display area is selected by the user, the processing module 301 detects face images each having times in the small section corresponding to the thumbnail image as time stamp information, and highlights all the detected face images by making them distinguishable from the others.

Figure 10:
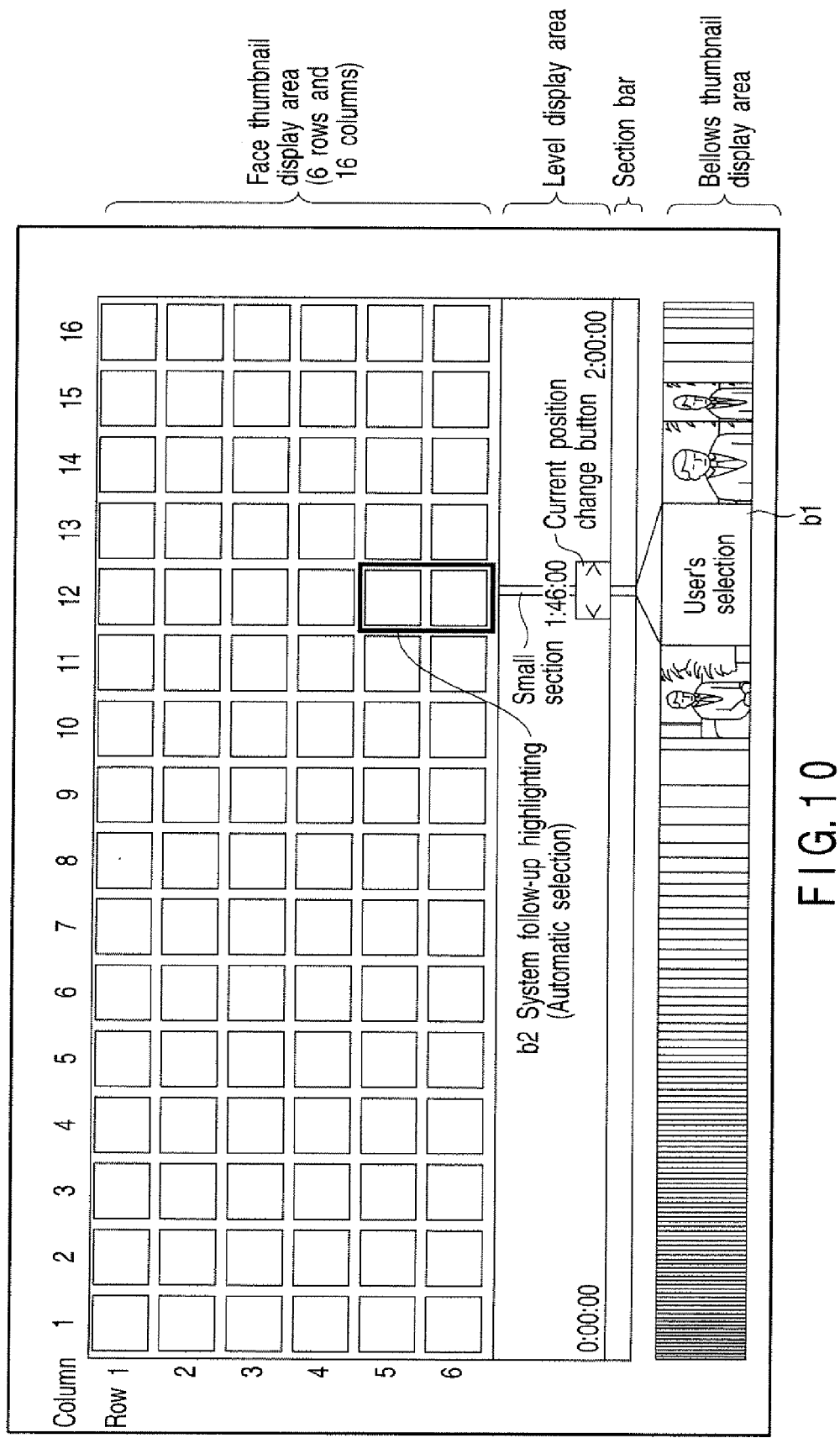
FIG. 10 is an exemplary second view for explaining the link display control between the face thumbnail display area and the bellows thumbnail display area included in the indexing view screen of FIG. 6.

That is, as shown in FIG. 10, when a certain thumbnail image (b1) is selected by the user, the face images of the persons who appear in the small section corresponding to the selected thumbnail images are automatically selected and emphasis-displayed (b2) in conjunction with the selection.

Figure 11:
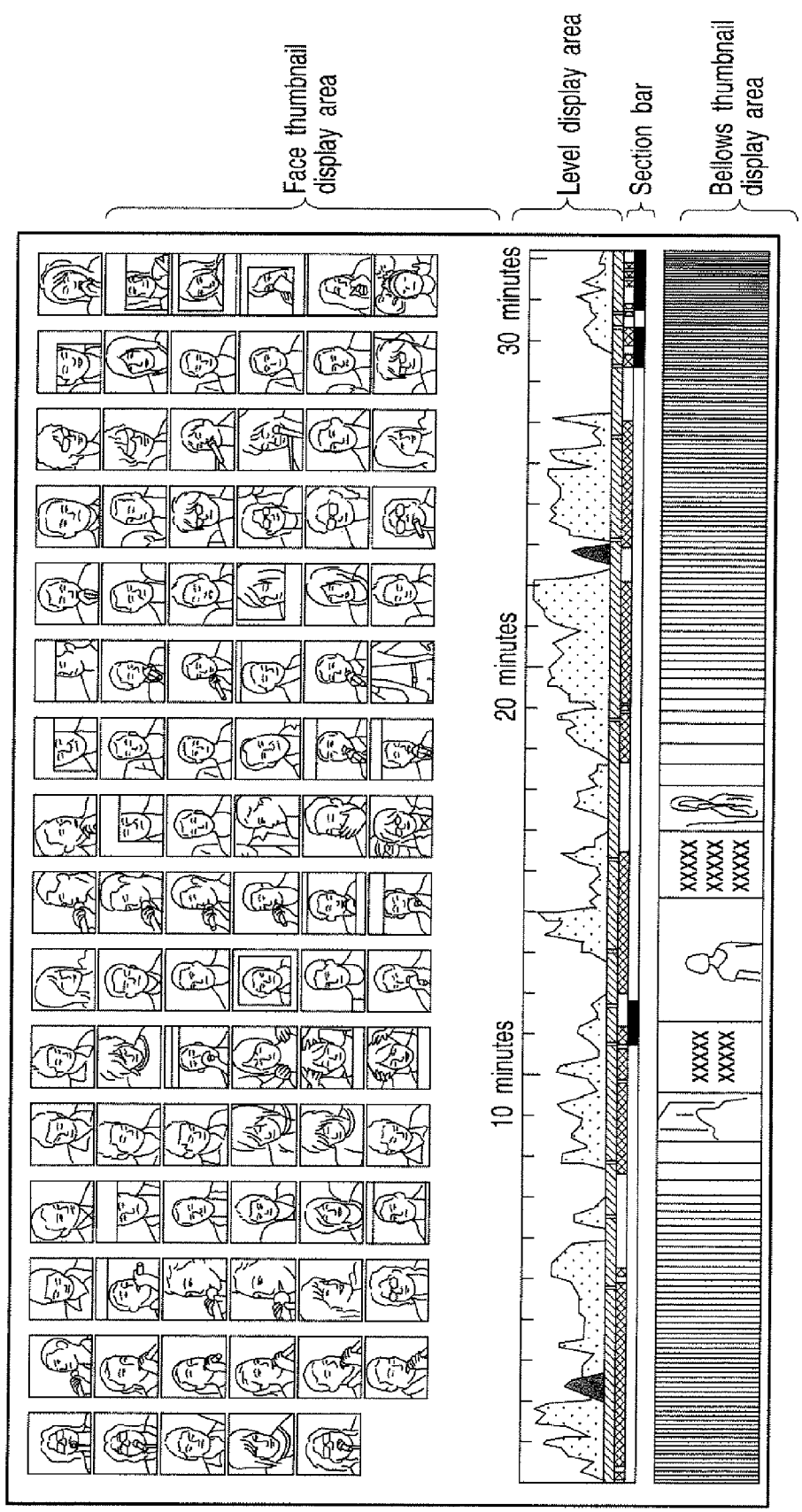
FIG. 11 is an exemplary first view showing a concrete example of a link display between the face thumbnail display area and the bellows thumbnail display area included in the indexing view screen of FIG. 6.
Figure 12:
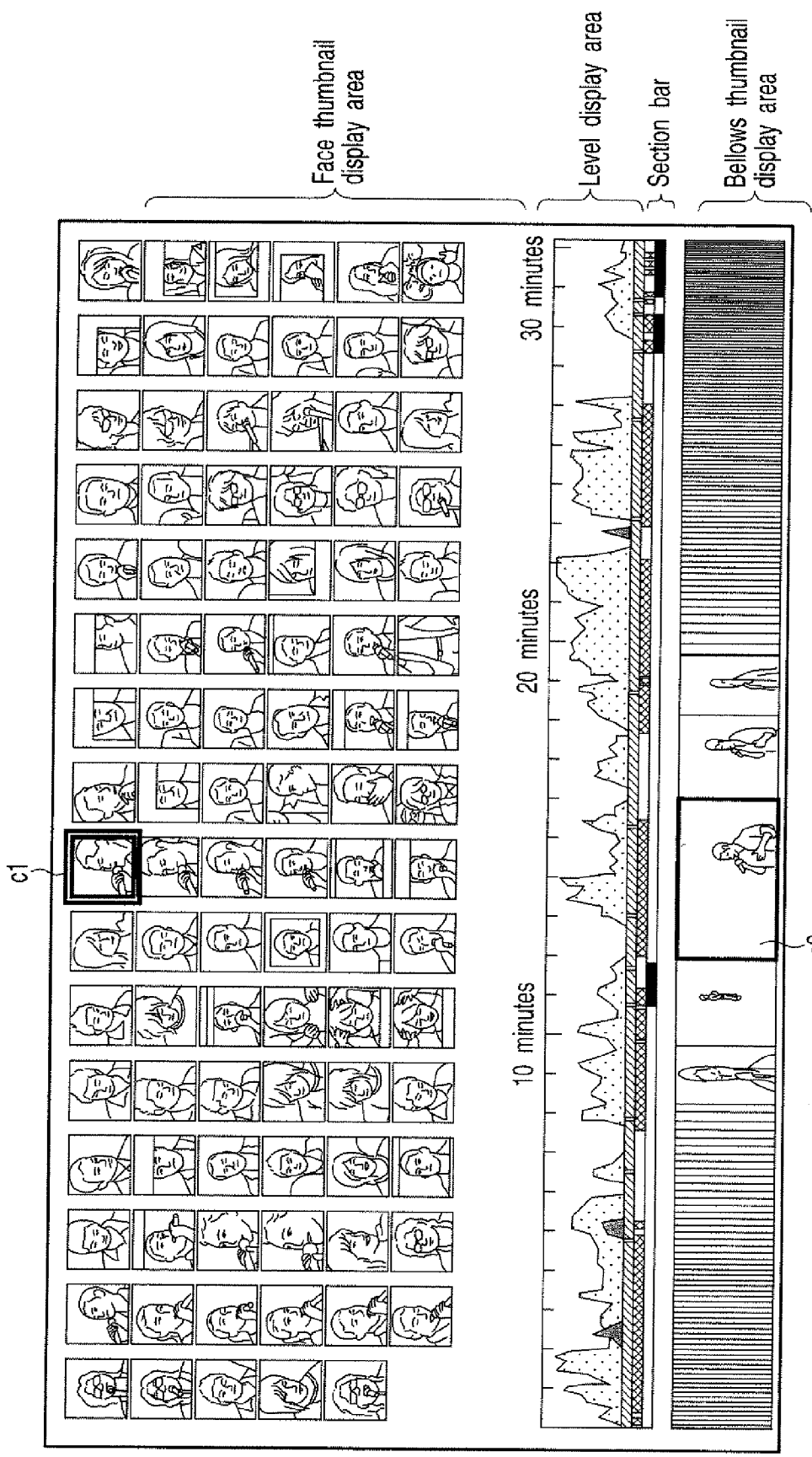
FIG. 12 is an exemplary second view showing the concrete example of the link display between the face thumbnail display area and the bellows thumbnail display area included in the indexing view screen of FIG. 6.

A transition example of a frame will be explained next, assuming that the indexing view screen is in a state as depicted in FIG. 11. In this state, when the user selects a face image (c1) positioned on the face thumbnail display area as shown in FIG. 12, the display of the thumbnail images in the bellows thumbnail image transits so that a thumbnail image (c2) in the time zone in which the character of the face image appears is displayed in a normal size in conjunction with this selection.

Figure 13:
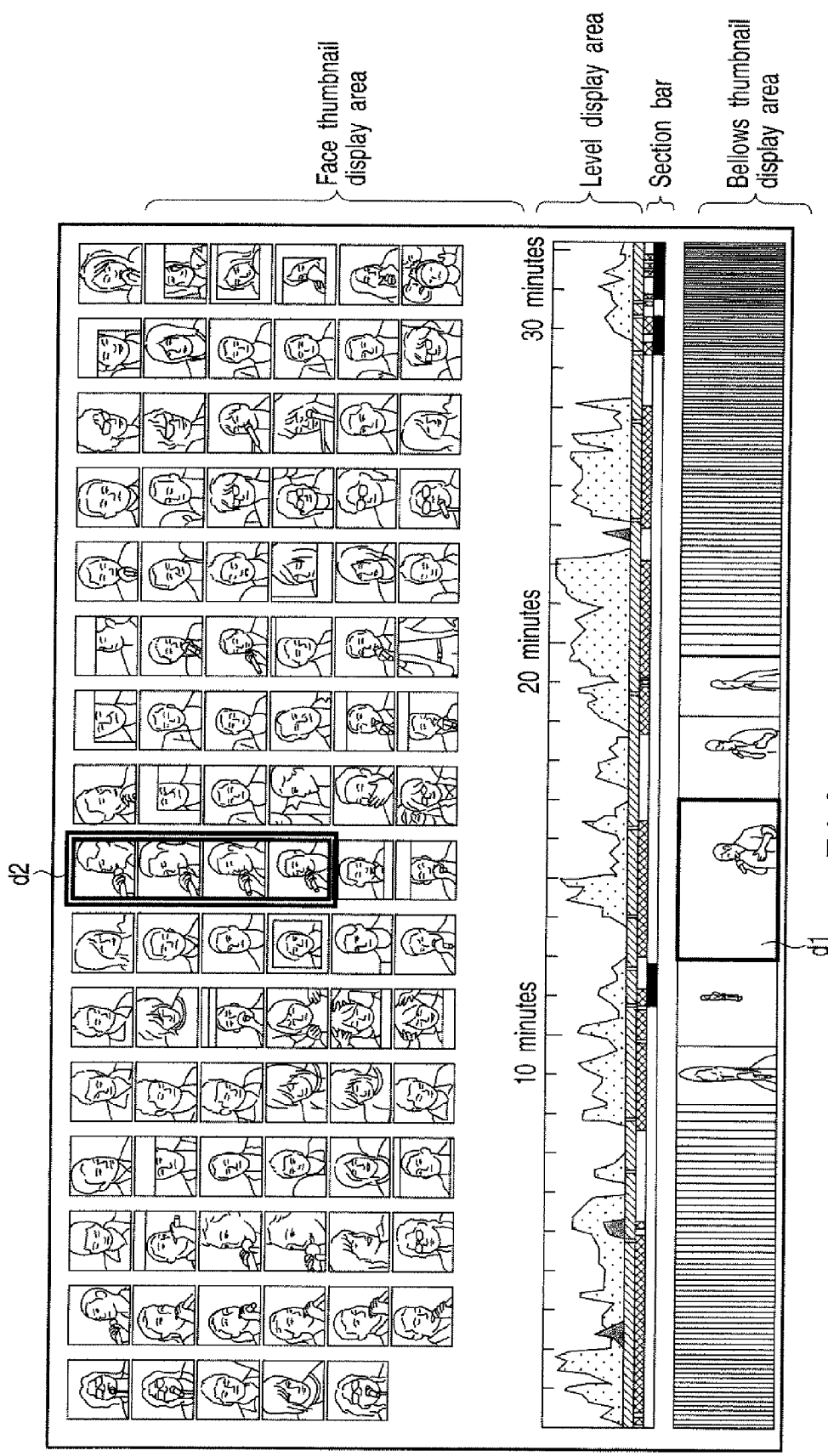
FIG. 13 is an exemplary third view showing the concrete example of the link display between the face thumbnail display area and the bellows thumbnail display area included in the indexing view screen of FIG. 6.

In the state shown in FIG. 11, when the user selects a certain thumbnail image (d1) in the bellows display area as shown in FIG. 13, the display of face images in the face thumbnail display area transits so that the thumbnail images appearing in the small section corresponding to the selected thumbnail images are highlighted in conjunction with this selection (d2).

Therefore, firstly, the user can confirm the thumbnail images in the time zone (scene) in which a person of the relevant face image appears on the bellows thumbnail display area, by selecting the face image on the face thumbnail display area. Secondly, the user can confirm the face images of the persons who appear in the time zone corresponding to the thumbnail image on the thumbnail display area, by selecting the thumbnail image on the bellows display area.

After this confirmation, if the user instructs reproduction start of the video content data in a state in which the user has selected a face image on the face thumbnail display area, the user can start to reproduce the video content data from a time point earlier than the time point shown by the time stamp information. If the user instructs reproduction start of the video content data in a state in which the user has selected the thumbnail image on the bellows thumbnail display area, the user can start to reproduce the video content data from a top position (time point) of the small section corresponding to the selected thumbnail image.

In this way, the computer 10 controlling to display the face thumbnail display area and the bellows thumbnail display area in conjunction with each other may present the video of the scene in which a desired person appears with a simple operation, and may present a face image of a person appearing in each scene with a simple operation.

Figure 14:
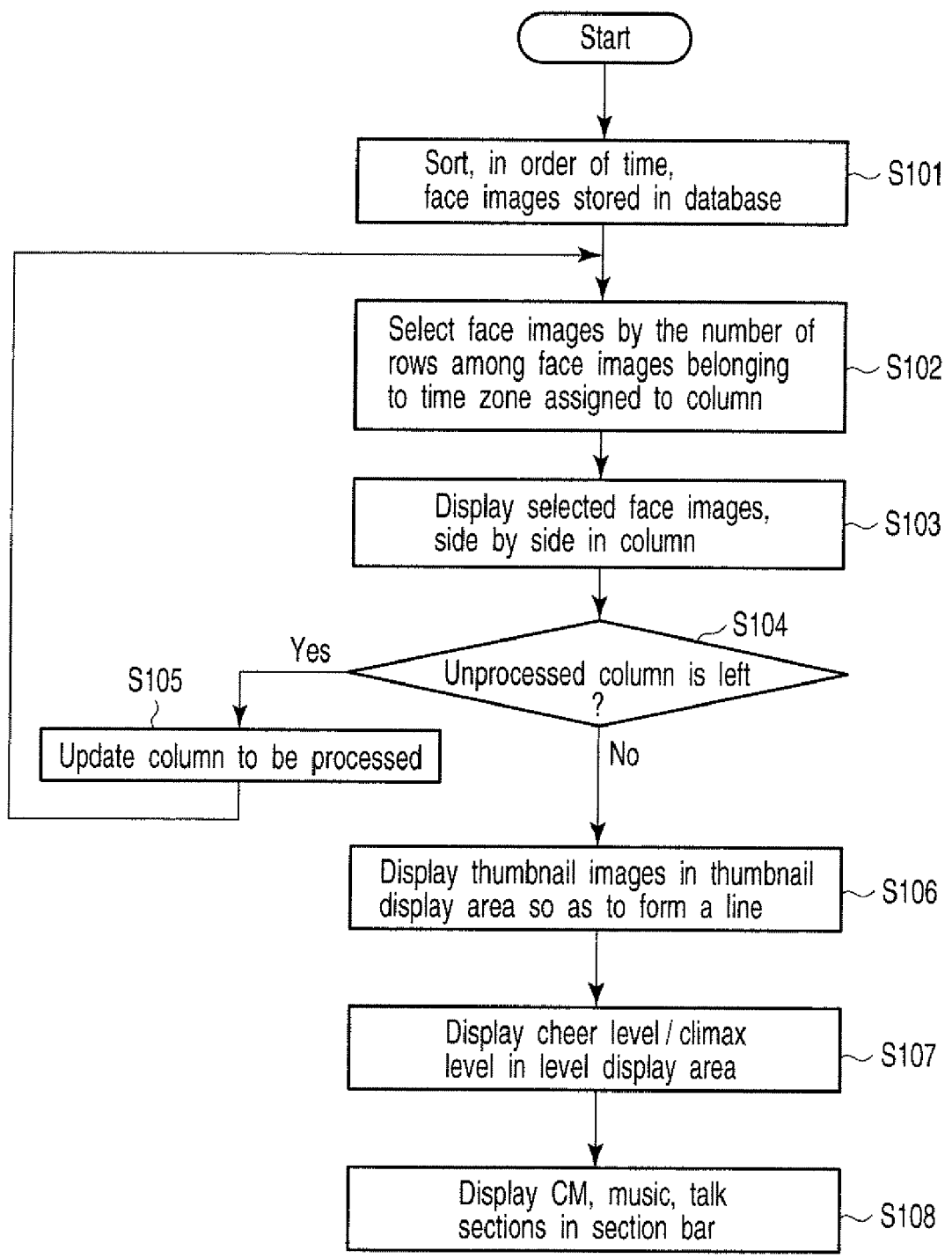
FIG. 14 is an exemplary flowchart showing a procedure of face image list display processing to be executed by the electronic apparatus of the embodiment.

Next, a procedure of display processing to be executed by the face image list display processing unit 301 will be described with reference to FIG. 14.

The processing module 301 firstly sorts each face image stored in the database 111A in order of the appearance time on the basis of the time stamp information corresponding to each face image (Block S101). The processing module 301 then decides the number of the rows and columns in response to the face image size specified by the user for displaying the face image. The processing module 301 calculates a time zone to be assigned to each column (large section), for example, by evenly dividing the total time length of the video data content of an indexing object by the number of columns. The processing module 301 selects the face images by the number of rows among the face images belonging to the time zone assigned to the column of a display processing object (Block S102). When the number of face images belonging to the time zone assigned to the column of the display processing object is larger than the number of rows, the processing module 301 may also, for example, perform processing to preferentially select face images with high possibilities of appearance.

In this case, the processing module 301 preferentially selects the face images with high possibilities of appearance in the time zone assigned to the column of the display processing object among the face images belonging to the assigned time zone. For instance, the video processor 113 may execute clustering processing classifying each face image of the same person into the same category on the basis of the relationships of feature data of each extracted face image. In this case, as shown in FIG. 15, each face image is classified into each person (i.e., for each category) and stored in the database 111A. In FIG. 15, a category 1 shows a set of face images of a certain person "A", a category 2 shows a set of face images of a certain person "B", and a category 3 shows a set of face images of a certain person "C". The processing module 301 preferentially selects the face image of a person with a high possibility of appearance. In the time zone in which only the face image of a specified person keeps appearing for a relatively long time period, the processing module 301 may display a plurality of different face images of the same person on a column corresponding to the relevant time zone.

In a case in which the number of face images belonging to the time zone assigned to the column of the display processing object is larger than the number of rows, the processing module 301 may preferentially select the face image of a large size among the face images belonging to the time zone assigned to the column of the display processing object on the basis of each piece of size information stored in the database 111A.

The size of a face image to be extracted from the frame displaying the close-up face becomes relatively large. Therefore, the larger the size of the extracted face image is, the higher the possibility that the person of the extracted face image is an important person. Thus, preferentially selecting the face image with the large size enables preferentially displaying the face image of the person with the high importance.

The processing module 301 then displays each selected face image, for example, in order of appearance frequency in a plurality of face image display areas in the column of the display processing object (Block S103). The higher the appearance frequency of the face image is, the higher up the face image in the image display area is.

The processing in Blocks S102 and S103, is repeatedly executed until processing for all the columns is completed while updating column numbers of display processing objects (Blocks S104, S105). As a result, a plurality of face images are displayed in a first display mode in the face image display area.

In a case where the number of the face images belonging to the time zone assigned the column of the display processing object is smaller than the number of the rows, the processing module 301 may display the thumbnail images belonging to the corresponding-time zone in the column of the display processing object.

When the processing for all the columns is completed (NO in Block S104), the processing module 301 displays each thumbnail image stored in the database 111A so as to form a line in order of the time of appearance of the thumbnail images in the bellows thumbnail display area on the basis of each piece of time stamp information of the thumbnail images (Block S106).

Next, the processing module 301 reads the cheer level information and the climax level information from the database 111A, and displays a graph showing a change in the cheer level and a graph showing a change in the climax level in a sequence from the start position to the end position of the video content data in the level display area in accordance with the cheer level information and the climax level information (Block S107).

Next, the processing module 301 reads the CM section attribute information, the music section attribute information and the talk section attribute information and displays the CM section bar, the music section bar, and talk section bar, respectively, on the basis of the above pieces of the read information (Block S108). In the CM section bar, the bar area showing the position of the CM section is displayed. Similarly, in the music section bar, the bar area showing the position of the music section is displayed, and in the talk section bar, the talk bar area showing the position of the talk section is displayed.

A procedure of link display processing between the face thumbnail display area and the bellows display area will be described by referring to flowcharts of FIGS. 16 and 17.

Figure 16:
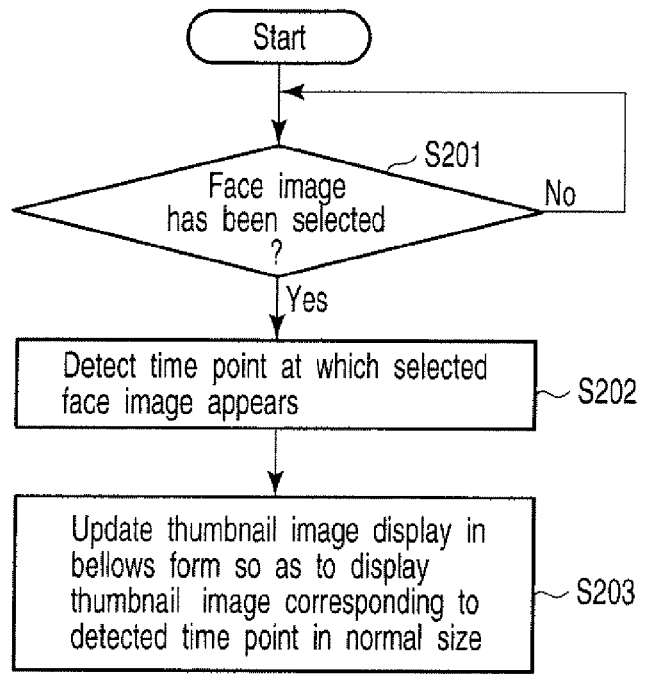
FIG. 16 is an exemplary first flowchart showing a procedure of link display processing between the face thumbnail display area and a bellows thumbnail display area to be executed by the electronic apparatus of the embodiment.

When the user selects a certain face image in the face thumbnail display area (YES in Block S201 of FIG. 16), the processing module 301 detects the time point at which the person of the face image appears, based on the time stamp information (Block S202 of FIG. 16). The processing module 301 updates the display state of the thumbnail image in the bellows thumbnail display area so as to display the thumbnail image corresponding to the detected time point in a normal size (Block S203 of FIG. 16).

Figure 17:
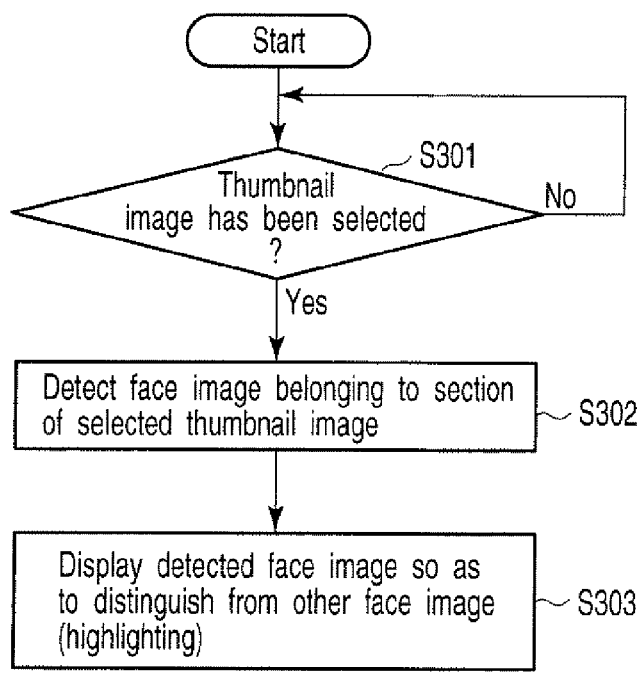
FIG. 17 is an exemplary second flowchart showing the procedure of the link display processing between the face thumbnail display area and the bellows thumbnail display area to be executed by the electronic apparatus of the embodiment.

Meanwhile, when the user selects the thumbnail image on the thumbnail display area (YES in Block S301 of FIG. 17), the processing module 301 detects the face images having the times in the small section corresponding to the selected thumbnail image as the time stamp information (Block S302 of FIG. 17). The processing module 301 updates the display state of the face thumbnail display area so as to highlight all the face images by making them distinguishable from other faces (Block S303 of FIG. 17).

Figure 18:
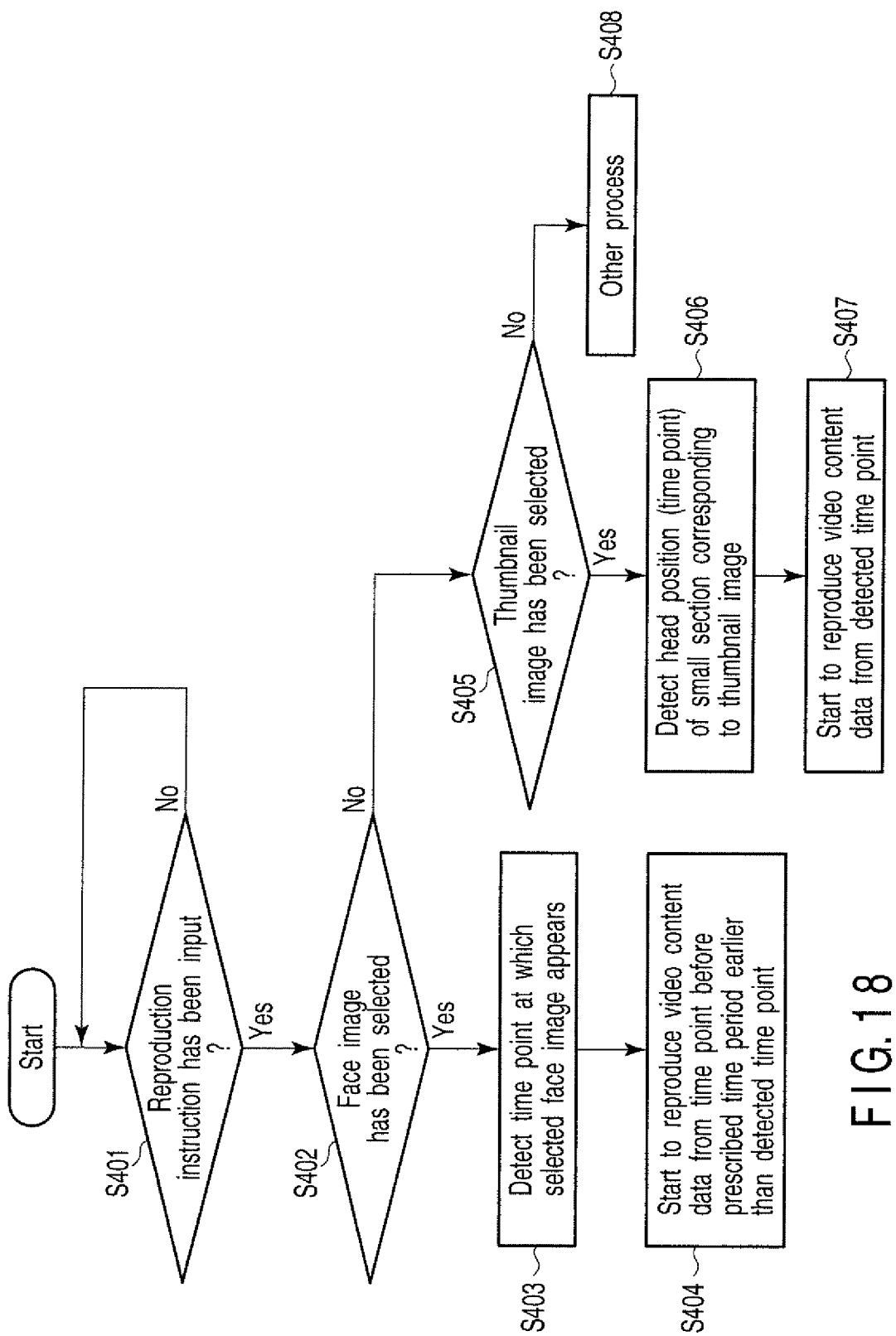
FIG. 18 is an exemplary flowchart showing a procedure of reproduction processing to be executed by the electronic apparatus of the embodiment.

Next, a procedure of reproduction processing to be executed by the reproduction processing module 403 will be described with reference to a flowchart of FIG. 18.

When the user inputs a reproduction instruction to reproduce the video content data (YES in Block S401), the reproduction processing module 403 cooperates with the display processing module 301 to determine whether or not the face image on the thumbnail display area has been selected (Block S402). If the selected face image exists (YES in Block S402), the reproduction processing module 403 detects the time point at which the selected face image appears on the basis of the time stamp information of the selected face image (Block S403). The reproduction processing module 403 starts the reproduction of the video content data from a time point before a predetermined time, for example, two seconds, earlier than the detected time point (Block S404).

If the selected face image does not exist (NO in Block S402), the reproduction processing module 403 cooperates with the display processing unit 301 to determine whether or not the thumbnail image on the bellows thumbnail display area is selected by the user (Block S405). If the selected thumbnail image exists (YES in Block S405), the reproduction processing module 403 detects a head position (time point) of the small section corresponding to the selected thumbnail image (Block S406), and starts the reproduction of the video content data (Block S407).

As mentioned above, in the embodiment, the electronic apparatus can present to the user what character appears at what time zone of the whole of the video content data without reproducing the video content data. Further, the electronic apparatus can present the video of the scene in which the desired character appears in accordance with a simple operation, and can present the face image of the character appearing at each scene in accordance with a simple operation.

While the embodiment has generated the indexing information (face image indexing information, section attribute information, etc.) from the video processor 113 functioning as the indexing processing unit, there is no need to perform the indexing processing in a case in which, for example, the indexing information corresponding to broadcasting program data is included in advance in the broadcasting program data. Therefore, the face image list display function of the embodiment also may be achieved solely by the database 111A and the face image list display processing module 301.

Since the whole procedure of the face image list display processing of the embodiment can be achieved through software, introducing the software into a normal computer through a computer-readable storage medium enables easily achieving the same effect as that of the embodiment.

Furthermore, the electronic apparatus of the embodiment can be actualized not only by the computer 10 but also by various consumer electronic apparatuses, such as, a HDD recorder, a DVD recorder and a television receiver. In this case, the function of the TV application program 202 can be actualized by hardware such as a microcomputer.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

What is claimed is:

1. An electronic apparatus, comprising:
a storage device to store a plurality of face images extracted from video content data, a plurality of thumbnail images corresponding to a plurality of frames where each frame is selected from each section obtained by dividing the video content data at even time intervals, and time stamp information indicating a time point at which each of the face images appears in the video content data;
a face image list display module configured to display face images in a plurality of face image display areas forming a two-dimensional display area arranged in a matrix including a plurality of rows and a plurality of columns, each column belonging to a different time zone and face images assigned to each column and arranged in an order of appearance frequency based on the time stamp information; and
a thumbnail image display module configured to display the plurality of thumbnail images side-by-side in a chronological order of appearance in a thumbnail display area arranged at one side of a lower side or an upper side in the two dimensional display area, the thumbnail image display module displaying one of the thumbnail images with a normal size and displaying the others such that the lateral direction sizes are reduced in comparison with that of the thumbnail displayed in the normal size,
a link display control module configured to cause the face image list display module to perform display control of the plurality of face images so as to make face images having times in a section corresponding to a selected thumbnail image as time stamp information distinguishable from the others, when the thumbnail image in the thumbnail display area displayed by the thumbnail image display module is selected.

2. The electronic apparatus of claim 1, wherein the face image list display module is configured to highlight face images having the times in the section corresponding to the selected thumbnail image as the time stamp information.

3. The electronic apparatus of claim 1, further comprising a reproduction processing module configured to start to reproduce the video content data from a time point before a predetermined time earlier than a time point at which a selected face image appears or from the time point at which the selected face image appears based on the time stamp information, when an instruction to select the face image displayed so as to be distinguishable from other face images is issued and an instruction to reproduce the video content data is issued.

4. A method of controlling displaying images on an electronic apparatus comprising a storage device to store a plurality of face images extracted from video content data, a plurality of thumbnail images corresponding to a plurality of frames selected one each from each section obtained by dividing the video content data at even time intervals, and time stamp information indicating a time point at which each of the face images appears in the video content data, the method comprising:
displaying face images in a plurality of face image display areas forming a two-dimensional display area arranged in a matrix including a plurality of rows and a plurality of columns, each column belonging to a different time zone and face images assigned to each column and arranged in an order of appearance frequency based on the time stamp information;
displaying the plurality of thumbnail images side-by-side in a chronological order of appearance in a thumbnail display area arranged at one side of a lower side or an upper side in the two dimensional display area, the displaying the plurality of thumbnail images displaying one of the thumbnail images with a normal size and displaying the others such that the lateral direction sizes of the others are reduced in comparison with that of the thumbnail displayed in the normal size, and
causing the displaying the face images to perform display control of the plurality of face images so as to make face images having times in a section corresponding to a selected thumbnail image as time stamp information distinguishable from the others, when the thumbnail image in the thumbnail display area displayed by the displaying the plurality of thumbnail images is selected.

5. The method of claim 4, wherein the displaying the face images is configured to highlight face images having the times in the section corresponding to the selected thumbnail images as time stamp information.

6. The method of claim 4, further comprising starting to reproduce the video content data from a time point before a predetermined time earlier than a time point at which a selected face image appears or from the time point at which the selected face image appears based on the time stamp information, when an instruction to select the face image displayed so as to be distinguishable from other face images is issued and an instruction to reproduce the video content data is issued.

7. A non-transitory computer-readable storage medium having stored thereon instructions that, when executed by a processor implemented within a computer comprising a storage device to store a plurality of face images extracted from video content data, a plurality of thumbnail images corresponding to a plurality of frames selected one each from each section obtained by dividing the video content data at even time intervals, and time stamp information indicating a time point at which each of the face images appears in the video content data, cause the computer to:
display by a face image list display module face images in plurality of face image display areas forming a two-dimensional display area arranged in a matrix including a plurality of rows and a plurality of columns, each column belonging to a different time zone and face images assigned to each column and arranged in an order of appearance frequency based on the time stamp information
display by a thumbnail image display module the plurality of thumbnail images side-by-side in a chronological order of appearance in a thumbnail display area arranged at one side of a lower side or an upper side in the two dimensional display area, the thumbnail image display module displaying one of the thumbnail images with a normal size and displaying the others such that the lateral direction sizes are reduced in comparison with that of the thumbnail displayed in the normal size, and
cause by a link display control module the face image list display module to perform display control of the plurality of face images so as to make face images having times in a section corresponding to a selected thumbnail image as time stamp information distinguishable from the others, when the thumbnail image in the thumbnail display area displayed by the thumbnail image display module is selected.

8. The non-transitory computer-readable storage medium of claim 7, wherein the face image list display module is configured to highlight face images having the times in the section corresponding to the selected thumbnail image as the time stamp information.

9. The non-transitory computer-readable storage medium of claim 7, further stored thereon instructions that cause the computer to start to reproduce, by a reproduction processing module, the video content data from a time point before a predetermined time earlier than a time point at which a selected face image appears or from the time point at which the selected face image appears based on the time stamp information, when an instruction to select the face image displayed so as to be distinguishable from other face images is issued and an instruction to reproduce the video content data is issued.

* * * * *